US009860422B2

(12) United States Patent
Horiuchi et al.

(10) Patent No.: US 9,860,422 B2
(45) Date of Patent: Jan. 2, 2018

(54) CORRECTION METHOD FOR IMAGE FORMING APPARATUS

(71) Applicant: CANON KABUSHIKI KAISHA, Tokyo (JP)

(72) Inventors: Izuru Horiuchi, Tokyo (JP); Yasutomo Furuta, Abiko (JP); Ryuichi Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/210,365

(22) Filed: Jul. 14, 2016

(65) Prior Publication Data

US 2017/0019560 A1    Jan. 19, 2017

(30) Foreign Application Priority Data

Jul. 16, 2015    (JP) ................................. 2015-141776

(51) Int. Cl.
| | |
|---|---|
| *G06K 15/00* | (2006.01) |
| *H04N 1/405* | (2006.01) |
| *H04N 1/06* | (2006.01) |
| *H04N 1/113* | (2006.01) |
| *G03G 15/043* | (2006.01) |

(52) U.S. Cl.
CPC ......... *H04N 1/4052* (2013.01); *G03G 15/043* (2013.01); *H04N 1/06* (2013.01); *H04N 1/113* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,837,011 B2 * | 9/2014 | Takikawa ............. | G03G 15/043 347/233 |
| 8,917,305 B2 | 12/2014 | Nakahata et al. . | G03G 15/0415 |

(Continued)

FOREIGN PATENT DOCUMENTS

JP    2012-098622    5/2012

OTHER PUBLICATIONS

U.S. Appl. No. 15/210,380, filed Jul. 14, 2016.

(Continued)

*Primary Examiner* — Helen Q Zong
(74) *Attorney, Agent, or Firm* — Fitzpatrick, Cella, Harper & Scinto

(57) ABSTRACT

A correction method for an image forming apparatus including a light source including light emitting points, a photosensitive member configured to rotate in a first direction, and a deflecting unit configured to deflect light beams emitted from the light source in a second direction orthogonal to the first direction, the correction method includes: a first correction step of correcting sparseness and denseness of density in the first direction by moving a predetermined pixel in the first direction, and causing a pixel value of the predetermined pixel to be output or not to be output in accordance with movement of the predetermined pixel; and a second correction step of correcting the pixel value of the predetermined pixel by moving the pixel value of the predetermined pixel in the second direction so that a pixel value is caused to be output or not to be output with a plurality of continuous pixels.

14 Claims, 23 Drawing Sheets

(56) References Cited

U.S. PATENT DOCUMENTS

| | | | |
|---|---|---|---|
| 9,261,809 B2 | 2/2016 | Furuta | G03G 15/04072 |
| 2004/0001152 A1* | 1/2004 | Funamoto | H04N 5/217 |
| | | | 348/222.1 |
| 2008/0062399 A1* | 3/2008 | Yoshida | G03G 15/5033 |
| | | | 355/69 |
| 2013/0038671 A1* | 2/2013 | Yoshida | B41J 2/473 |
| | | | 347/118 |
| 2016/0147170 A1 | 5/2016 | Furuta | G03G 15/043 |
| 2016/0219186 A1* | 7/2016 | Tsue | H04N 1/0473 |

OTHER PUBLICATIONS

U.S. Appl. No. 15/210,389, filed Jul. 14, 2016.
U.S. Appl. No. 15/210,394, filed Jul. 14, 2016.
U.S. Appl. No. 15/210,402, filed Jul. 14, 2016.
U.S. Appl. No. 15/222,692, filed Jul. 28, 2016.
U.S. Appl. No. 15/222,687, filed Jul. 28, 2016.

\* cited by examiner

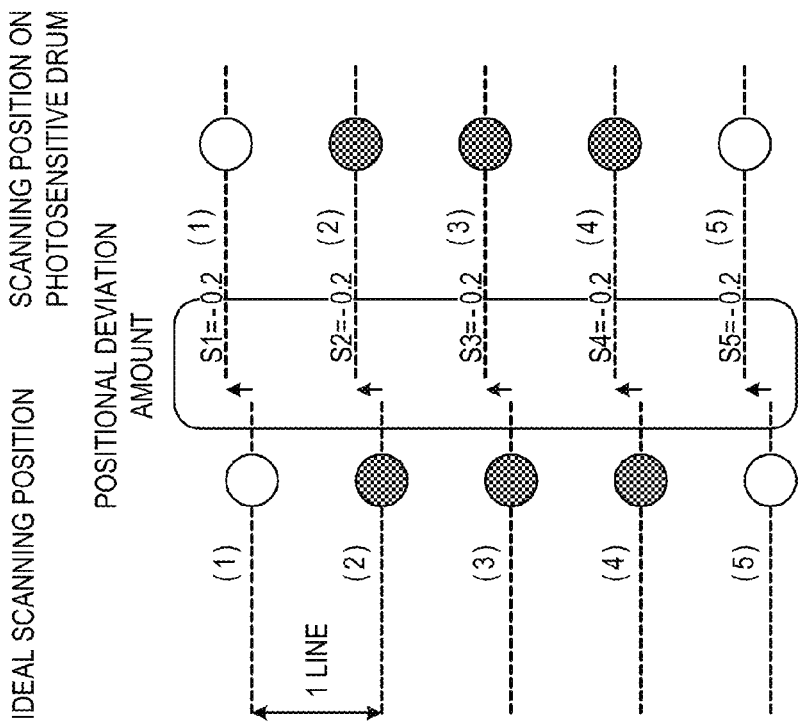
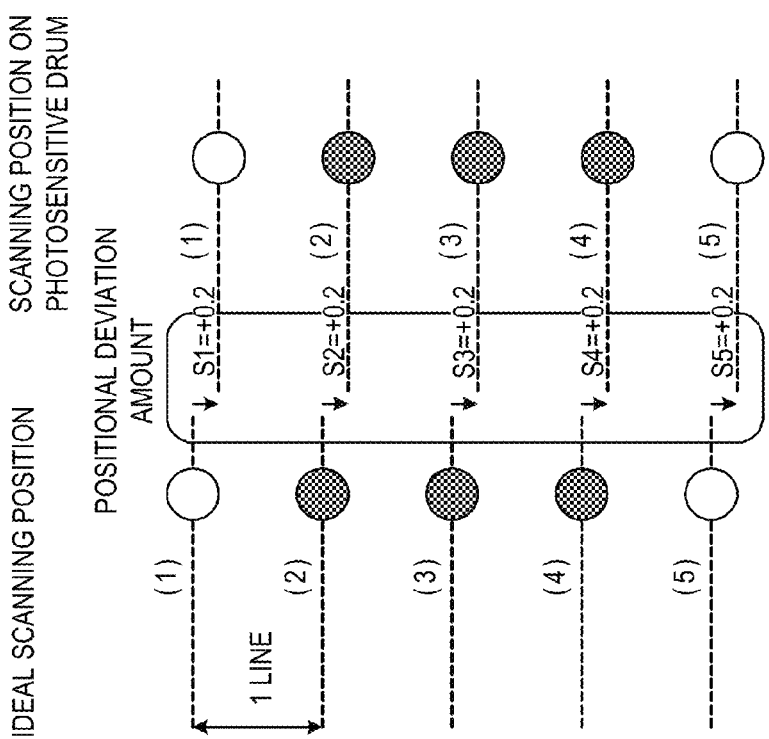

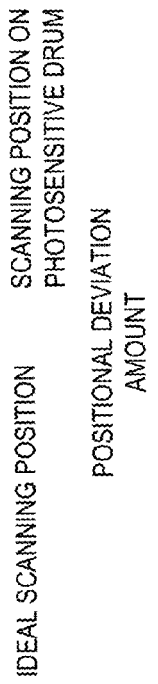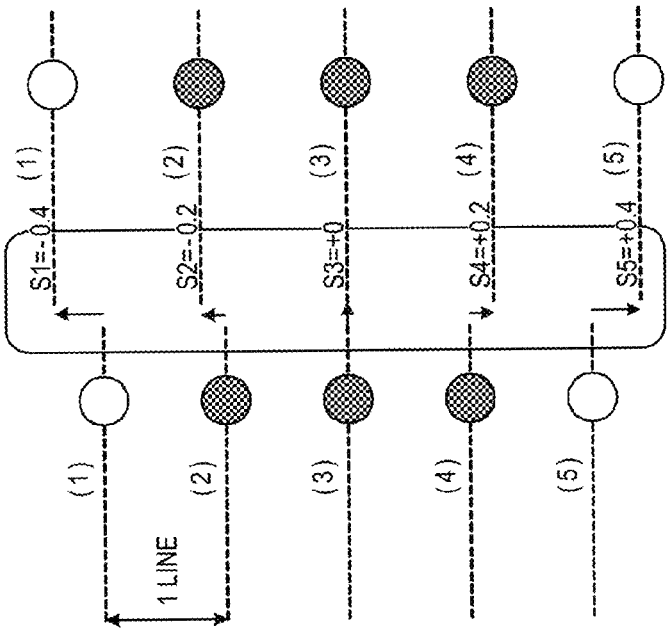
FIG. 7C
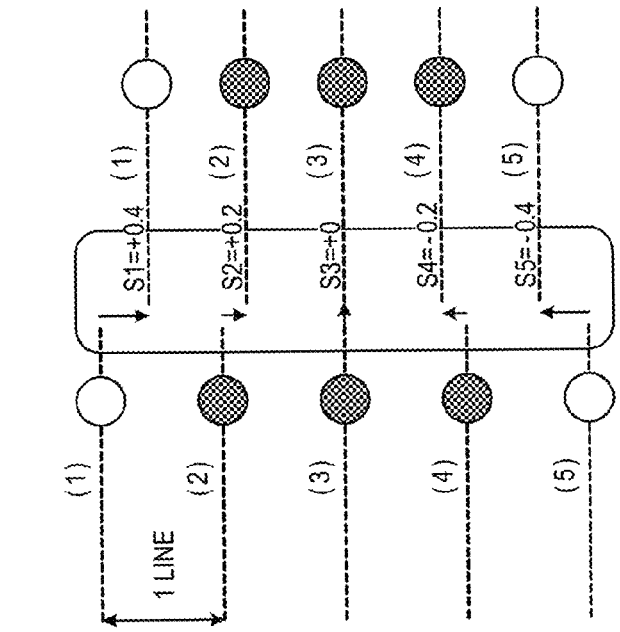
FIG. 7D

SCANNING POSITIONS ARE SHIFTED IN ADVANCE DIRECTION

SCANNING POSITIONS ARE SHIFTED IN RETURN DIRECTION

SCANNING POSITIONS ARE DENSE

SCANNING POSITIONS ARE SPARSE

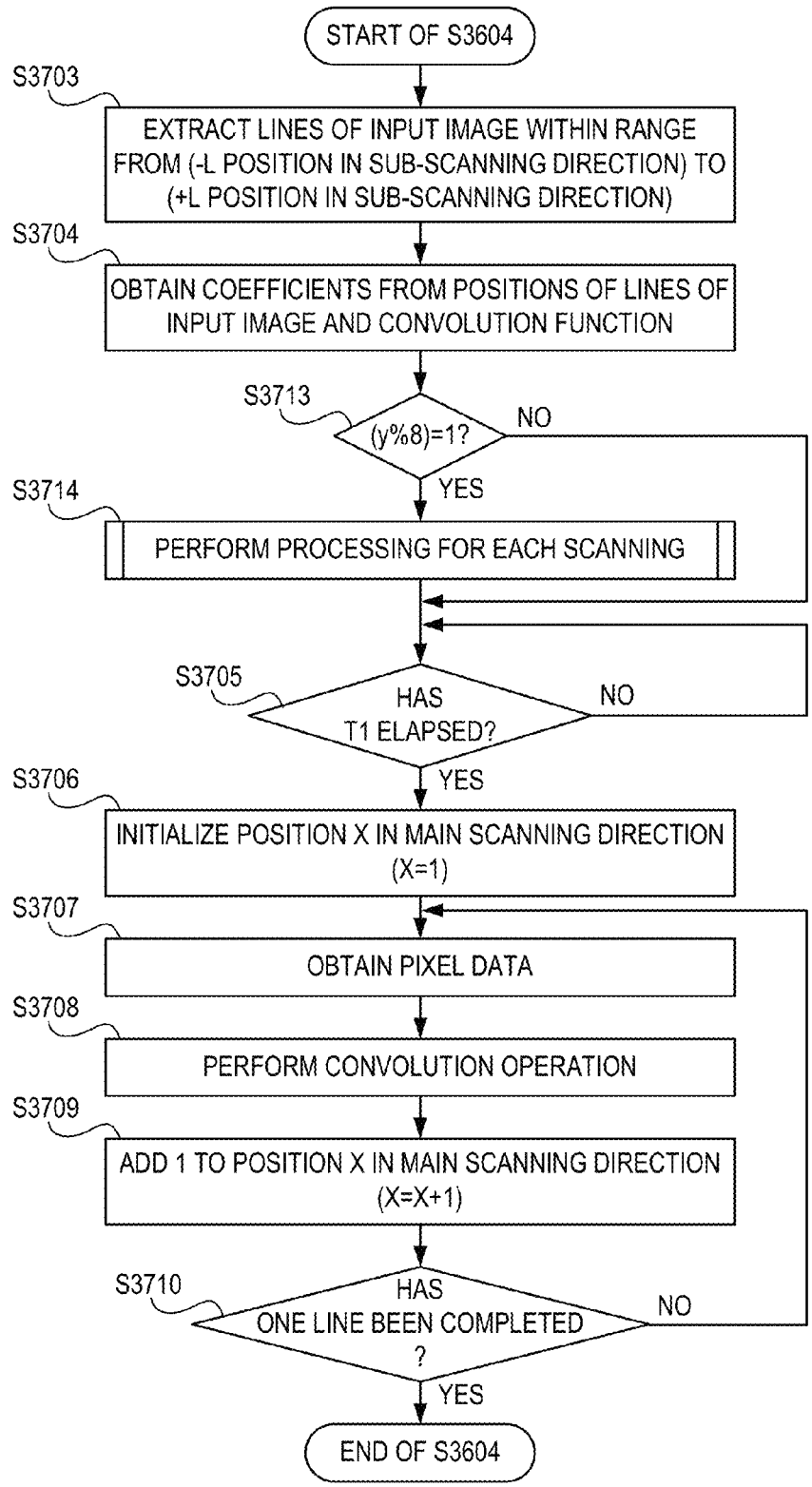

BEFORE PROCESSING

AFTER PROCESSING

BEFORE PROCESSING

AFTER PROCESSING

FIG. 20

|      | 0 | 1 | 2 | 3 | 4 | 5 | 6 | 7 | 8 | 9 | 10 | 11 | 12 | 13 | 14 | 15 |
|------|---|---|---|---|---|---|---|---|---|---|----|----|----|----|----|----|
| 0000 | 0 | 0 | 0 | 0 | 0 | 0 | 0 | 0 | 0 | 0 | 0  | 0  | 0  | 0  | 0  | 0  |
| 0001 | 0 | 0 | 0 | 0 | 0 | 0 | 0 | 0 | 0 | 0 | 0  | 0  | 0  | 0  | 1  | 1  |
| 0010 | 0 | 0 | 0 | 0 | 0 | 0 | 0 | 0 | 0 | 0 | 0  | 0  | 0  | 1  | 1  | 1  |
| 0011 | 0 | 0 | 0 | 0 | 0 | 0 | 0 | 0 | 0 | 0 | 0  | 0  | 1  | 1  | 1  | 1  |
| 0100 | 0 | 0 | 0 | 0 | 0 | 0 | 0 | 0 | 0 | 0 | 0  | 1  | 1  | 1  | 1  | 1  |
| 0101 | 0 | 0 | 0 | 0 | 0 | 0 | 0 | 0 | 0 | 0 | 1  | 1  | 1  | 1  | 1  | 1  |
| 0110 | 0 | 0 | 0 | 0 | 0 | 0 | 0 | 0 | 0 | 1 | 1  | 1  | 1  | 1  | 1  | 1  |
| 0111 | 0 | 0 | 0 | 0 | 0 | 0 | 0 | 0 | 1 | 1 | 1  | 1  | 1  | 1  | 1  | 1  |
| 1000 | 0 | 0 | 0 | 0 | 0 | 0 | 0 | 1 | 1 | 1 | 1  | 1  | 1  | 1  | 1  | 1  |
| 1001 | 0 | 0 | 0 | 0 | 0 | 0 | 1 | 1 | 1 | 1 | 1  | 1  | 1  | 1  | 1  | 1  |
| 1010 | 0 | 0 | 0 | 0 | 0 | 1 | 1 | 1 | 1 | 1 | 1  | 1  | 1  | 1  | 1  | 1  |
| 1011 | 0 | 0 | 0 | 0 | 1 | 1 | 1 | 1 | 1 | 1 | 1  | 1  | 1  | 1  | 1  | 1  |
| 1100 | 0 | 0 | 0 | 1 | 1 | 1 | 1 | 1 | 1 | 1 | 1  | 1  | 1  | 1  | 1  | 1  |
| 1101 | 0 | 0 | 1 | 1 | 1 | 1 | 1 | 1 | 1 | 1 | 1  | 1  | 1  | 1  | 1  | 1  |
| 1110 | 0 | 1 | 1 | 1 | 1 | 1 | 1 | 1 | 1 | 1 | 1  | 1  | 1  | 1  | 1  | 1  |
| 1111 | 1 | 1 | 1 | 1 | 1 | 1 | 1 | 1 | 1 | 1 | 1  | 1  | 1  | 1  | 1  | 1  |

CORRECTION METHOD FOR IMAGE FORMING APPARATUS

BACKGROUND OF THE INVENTION

Field of the Invention

The present invention relates to a correction method for an image forming apparatus, for correcting distortion and uneven image density of an image during image formation of a two-dimensional image by the image forming apparatus, e.g., a digital copying machine, a multifunctional peripheral, or a laser printer.

Description of the Related Art

In electrophotographic image forming apparatus such as a laser printer and a copying machine, there has been generally known a configuration to form a latent image on a photosensitive member with use of a light scanning device configured to perform scanning with a laser beam. In the light scanning device of a laser scanning type, a laser beam collimated with use of a collimator lens is deflected by a rotary polygon mirror, and the deflected laser beam is formed into an image on a photosensitive member with use of an elongated fθ lens. Further, there is known multibeam scanning in which a laser light source having a plurality of light emitting points is included in one package so as to perform scanning with a plurality of laser beams simultaneously.

Meanwhile, in order to form a satisfactory image without uneven image density and banding, it is desired that distances between scanning lines of which positions to be scanned with a laser beam are adjacent to each other in a rotational direction of the photosensitive member be equal to each other. However, the distances between the scanning lines are varied due to a plurality of factors described below. The distances between the scanning lines on the photosensitive member are varied by, for example, a fluctuation in a surface speed of the photosensitive member, or a rotation speed fluctuation of a rotary polygon mirror. Further, the distances between the scanning lines are also varied by a variation in angle of mirror faces of the rotary polygon mirror with respect to a rotary shaft of the rotary polygon mirror and a variation in intervals between light emitting points arranged on a laser light source. FIG. 19A is an illustration of a state in which an interval between the scanning lines is varied periodically, with scanning of laser beams being represented by horizontal lines. As illustrated in FIG. 19A, when the interval between the scanning lines of laser beams is small, an image is developed darkly. When the interval between the scanning lines of laser beams is large, an image is developed lightly. Thus, the development is liable to be detected as moire and the like. To cope with uneven image density and banding caused by such factors, there has been proposed a technology of correcting banding by controlling an exposure amount of the light scanning device. For example, in Japanese Patent Application Laid-Open No. 2012-098622, there is described a configuration in which a beam position detection unit configured to detect a beam position in a sub-scanning direction is arranged in the vicinity of the photosensitive member, and the exposure amount of the light scanning device is adjusted based on scanning distance information obtained from a detected beam position, to thereby make banding less noticeable.

However, in the conventional method of adjusting density based on the exposure amount, an optimum amount of controlling a light amount is varied depending on a change in image forming conditions of the image forming apparatus. Therefore, it is difficult to perform banding correction stably. As the changes in image forming conditions, there are given, for example, a change in ambient temperature environment of the image forming apparatus, a change in sensitivity to light of the photosensitive member, and a change with time of characteristics of a toner material.

Further, in a color image forming apparatus, when positional deviation occurs at a relatively long period, positional deviation occurs between colors at a long period to cause an image defect, e.g., uneven hue. FIG. 19B is an illustration of a state of positional deviation of each scanning line. When printing is performed at a resolution of 1,200 dpi (scanning line interval: 21.16 μm) with respect to an image having an image width of 297 mm in an A4 longitudinal direction, about 14,000 scanning lines are formed. Due to the above-mentioned factors, e.g., a fluctuation in surface speed of the photosensitive member, the positional deviation amount between an ideal position of the scanning line and an actual scanning position in an image area is varied in a non-uniform manner. In FIG. 19B, in the 2,000th line and 7,000th line from a leading edge of an image, the scanning position of a scanning line represented by the solid line is deviated in a front direction from an ideal position represented by the broken line, and in the 10,000th line, the scanning position is deviated in a direction opposite to the front direction. Thus, when the scanning line, that is, the image position is deviated from the ideal position in the image area, a problem, e.g., a hue variation occurs, and hence a configuration to move the absolute position of image data is required.

SUMMARY OF THE INVENTION

The present invention has been made under the above-mentioned circumstances, and it is an object of the present invention to obtain satisfactory image quality by correcting uneven image density of an image, which occurs in a direction corresponding to a rotational direction of a photosensitive member.

According to one embodiment of the present invention, there is provided a correction method for an image forming apparatus, the image forming apparatus comprising:
a light source comprising a plurality of light emitting points;
a photosensitive member configured to rotate in a first direction so that a latent image is formed on the photosensitive member with light beams emitted from the light source; and
a deflecting unit configured to deflect the light beams emitted from the light source to move light spots of the light beams radiated to the photosensitive member in a second direction orthogonal to the first direction to form scanning lines, the correction method comprising:
a first correction step of correcting sparseness and denseness of density in the first direction caused by deviation of a scanning line in the first direction by moving a predetermined pixel in the first direction in accordance with the deviation of the scanning line, and causing a pixel value of the predetermined pixel to be output or not to be output in accordance with a movement of the predetermined pixel; and
a second correction step of correcting the pixel value of the predetermined pixel that is caused to be output or not to be output in the first correction step by moving the pixel value of the predetermined pixel in the second direction so that a pixel value is caused to be output or not to be output with a plurality of continuous pixels.

Further features of the present invention will become apparent from the following description of exemplary embodiments with reference to the attached drawings.

BRIEF DESCRIPTION OF THE DRAWINGS

FIG. 7A, FIG. 7B, FIG. 7C, and FIG. 7D are each a diagram for illustrating positional deviation of pixels for each classification according to the first and second embodiments.

FIG. 13 is a flowchart for illustrating first filtering according to the first and second embodiments.

FIG. 20 is a diagram for showing a conversion table for converting image data (density data) into drive data for generating a PWM signal.

DESCRIPTION OF THE EMBODIMENTS

Exemplary embodiments of the present invention will be described in detail below in an illustrative manner with reference to the drawings. A direction of an axis of rotation of a photosensitive drum, which is a direction in which scanning is performed with a laser beam, is defined as a main scanning direction that is a second direction, and a rotational direction of the photosensitive drum, which is a direction substantially orthogonal to the main scanning direction, is defined as a sub-scanning direction which is a first direction.

[First Embodiment]

<Overall Configuration of Image Forming Apparatus>

Figure 1A:
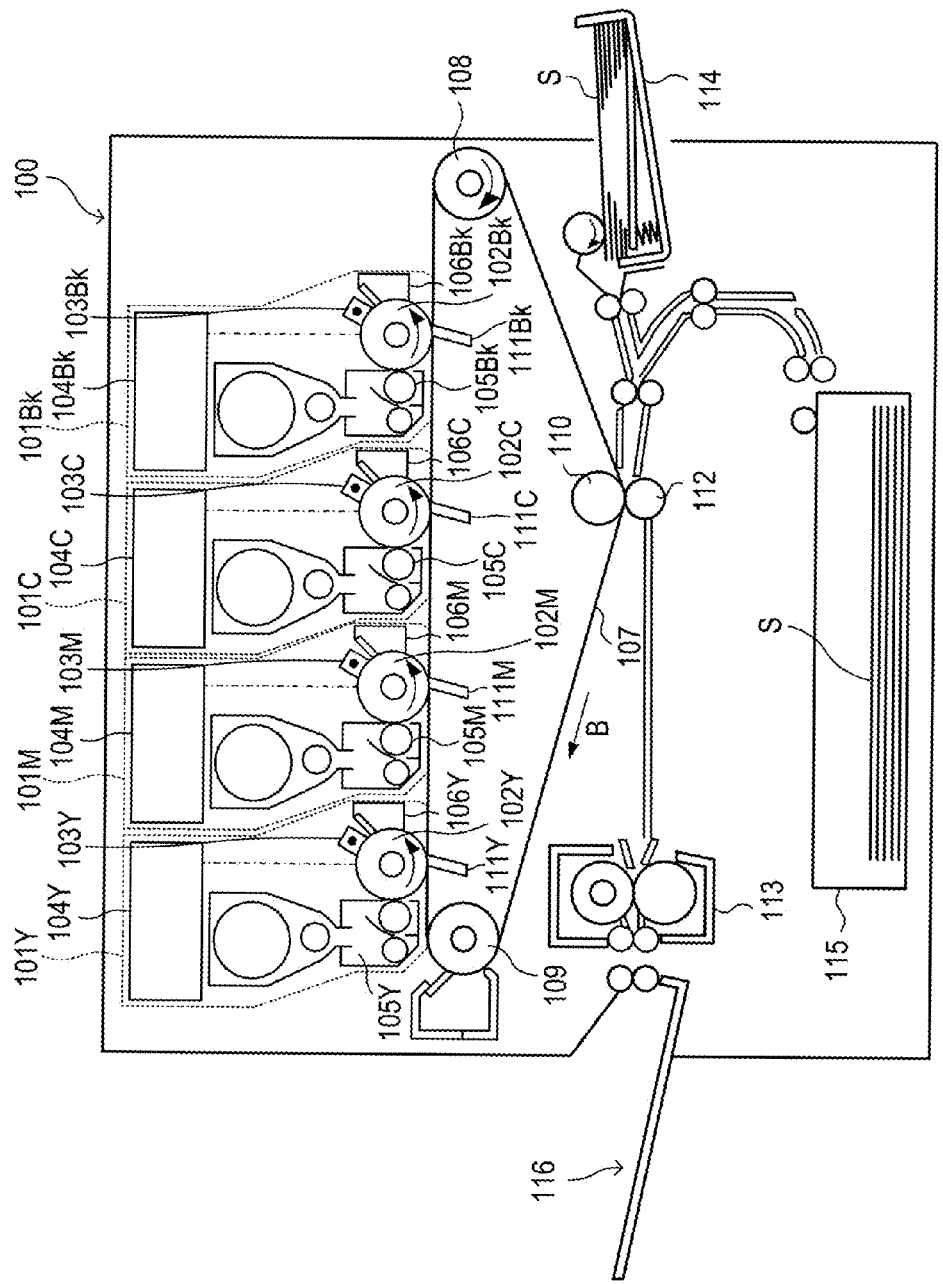
FIG. 1A is a view for illustrating an entire image forming apparatus according to first and second embodiments.

FIG. 1A is a schematic cross-sectional view of a digital full-color printer (color image forming apparatus) configured to perform image formation by using toners of a plurality of colors. An image forming apparatus 100 according to a first embodiment will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color will be described.

The image forming portions 101 each include a photosensitive drum 102, being a photosensitive member. A charging device 103, a light scanning device 104, and a developing device 105 are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer the toner image on the intermediate transfer belt 107 onto a sheet S being a recording medium and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The photosensitive drum 102Y which is driven to rotate in the arrow direction (counterclockwise direction) illustrated in FIG. 1A is charged by the charging device 103Y of the image forming portion 101Y. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed as a toner image of yellow by the developing device 105Y. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116.

<Photosensitive Drum and Light Scanning Device>

Figure 1B:
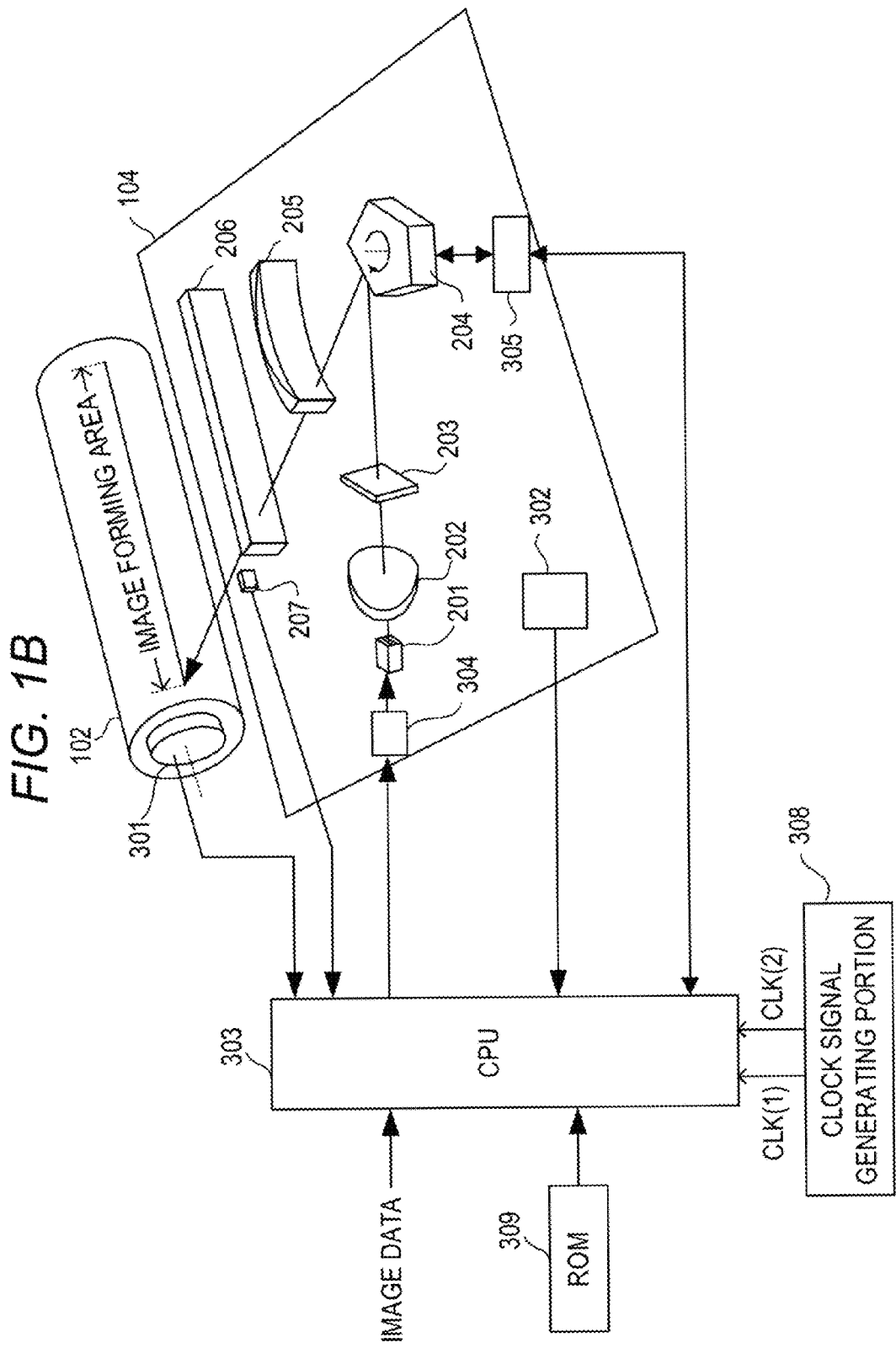
FIG. 1B is a view for illustrating a configuration of the periphery of a photosensitive drum and a light scanning device.

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204. The laser light source 201 includes a plurality of light emitting points. The plurality of light emitting points are each configured to emit a laser beam (light beam). The collimator lens 202 is configured to collimate the laser beam. The cylindrical lens 203 condenses the laser beam having passed through the collimator lens 202 in a sub-scanning direction. In the embodiment, the laser light source 201 is described by exemplifying a light source in which a plurality of light emitting points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion 305. The light scanning device 104 includes fθ lenses 205 and 206 configured to receive a laser beam (scanning light) deflected by the rotary polygon mirror 204. Further, the light scanning device 104 includes a memory (storage unit) 302 configured to store various pieces of information.

Further, the light scanning device 104 includes a beam detector 207 (hereinafter referred to as "BD 207") that is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The scanning direction of the laser beam is substantially parallel to the rotary shaft of the photosensitive drum 102. Every time the mirror face of the rotary polygon mirror 204 scans the photosensitive drum 102, the light scanning device 104 causes a laser beam emitted from the laser light source to scan the photosensitive drum 102 in the main scanning direction, to thereby form scanning lines corresponding to the number of laser elements simultaneously. In the embodiment, a configuration is described in which the rotary polygon mirror 204 has five mirror faces, and the laser light source 201 includes eight laser elements, as an example. That is, in the embodiment, an image of eight lines is formed with one scanning, and the rotary polygon mirror 204 scans the photosensitive drum 102 five times per one revolution of the rotary polygon mirror 204, to thereby form an image of forty lines in total.

The photosensitive drum 102 includes a rotary encoder 301 on the rotary shaft, and the rotation speed of the photosensitive drum 102 is detected with use of the rotary encoder 301 serving as a detection unit. The rotary encoder 301 generates 1,000 pulses per one revolution of the photosensitive drum 102, and outputs information on the rotation speed (rotation speed data) of the photosensitive drum 102 based on the results obtained by measuring a time interval between the pulses generated with use of a built-in timer to a CPU 303. A known speed detection technology other than the above-mentioned rotary encoder 301 may be used as long as the rotation speed of the photosensitive drum 102 can be detected. As a method other than the use of the rotary encoder 301, there is given, for example, a configuration to detect the surface speed of the photosensitive drum 102 with a laser Doppler.

Figure 2:
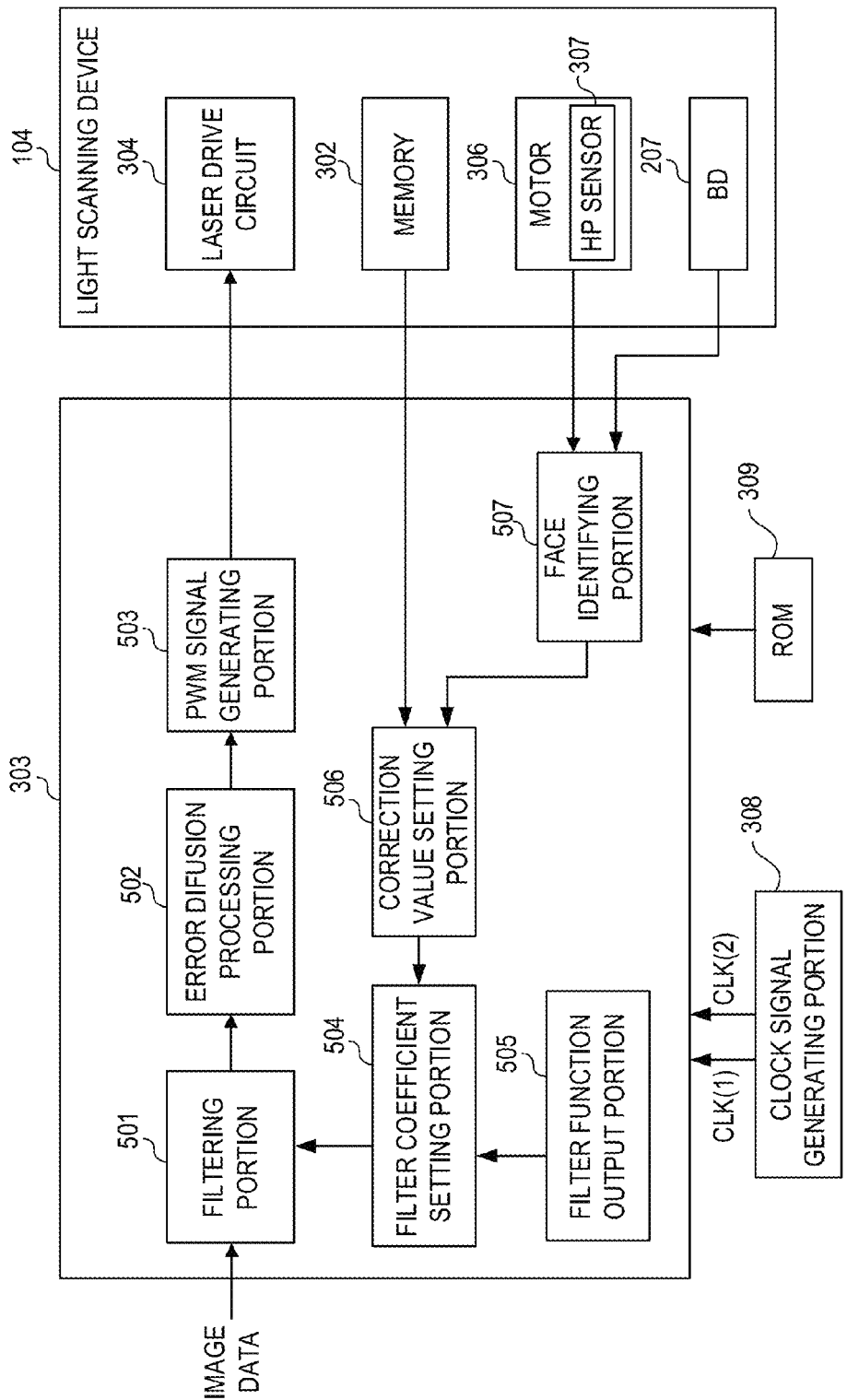
FIG. 2 is a block diagram of the image forming apparatus according to the first and second embodiments.

Next, the CPU 303 serving as the controller for the light scanning device 104 and a clock signal generating portion 308 will be described with reference to FIG. 2. The CPU 303 and the clock signal generating portion 308 are mounted on the image forming apparatus 100. FIG. 2 is a block diagram for illustrating the functions of the CPU 303 configured to execute correction processing of correcting distortion and uneven image density of an image described later. The CPU 303 includes a filtering portion 501, an error diffusion processing portion 502, and a pulse width modulation (PWM) signal generating portion 503. The filtering portion 501 is configured to perform filtering by subjecting input image data to a convolution operation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 308 is configured to output a clock signal CLK(1) and a clock signal CLK(2) to the CPU 303. The clock signal CLK(1) is a clock signal illustrated in FIG. 5 described later. The clock signal CLK(1) is a signal generated by multiplying the clock signal CLK(2). Thus, the clock signal CLK(1) and the clock signal CLK(2) have a synchronization relationship. In the embodiment, the clock signal generating portion 308 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

Further, the CPU 303 includes a filter coefficient setting portion 504, a filter function output portion 505, and a correction value setting portion 506. The filter function output portion 505 is configured to output data on a function to be used for a convolution operation (for example, data in a table) to the filter coefficient setting portion 504. As a function to be used for the convolution operation, there is given, for example, linear interpolation and bicubic interpolation. The correction value setting portion 506 is configured to identify a mirror face which reflects a laser beam from among a plurality of mirror faces based on a face synchronization signal input from a face identifying portion 507. The correction value setting portion 506 is configured to determine a positional deviation amount in the rotation direction of the photosensitive drum 102 of a scanning line formed with a laser beam deflected by the mirror face identified by the face identifying portion 507 described later. The correction value setting portion 506 then calculates a correction value based on the positional deviation amount of the scanning line and output the calculated correction value to the filter coefficient setting portion 504. The filter coefficient setting portion 504 is configured to calculate a filter coefficient to be used for the filtering in the filtering portion 501 based on information on the convolution function input from the filter function output portion 505 and the correction value input from the correction value setting portion 506. The filter coefficient setting portion 504 is configured to set the calculated filter coefficient in the filtering portion 501. The correction value input to the filter coefficient setting portion 504 from the correction value setting portion 506 is a correction value set individually for each of the plurality of mirror faces.

Further, the CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as a face synchronization signal.

The CPU 303 is configured to receive image data from an image controller (not shown) configured to generate image data. The image data is gradation data indicating a density value. The gradation data is data of a plurality of bits indicating a density value for each pixel. For example, in the case of image data of 4 bits, a density value of one pixel is expressed by 16 gradations, and in the case of image data of 8 bits, a density value of one pixel is expressed by 256 gradations. In the embodiment, the image data input to the CPU 303 from the image controller is 4 bits per pixel. The filtering portion 501 is configured to subject the image data to filtering for each pixel in synchronization with the clock signal CLK(2). The CPU 303 is connected to the rotary encoder 301, the BD 207, the memory 302, the laser drive circuit 304, and the rotary polygon mirror drive portion (hereinafter referred to as "mirror drive portion") 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

The HP sensor 307 is mounted on the rotary polygon mirror 204 and is configured to output the HP signal to the CPU 303 at timing at which the rotary polygon mirror 204 reaches a predetermined angle during a rotation operation. For example, the HP signal is generated once during every rotation of the rotary polygon mirror 204. The face identifying portion 507 resets an internal counter in response to the generation of the HP signal. Then, the face identifying portion 507 increments a count value of the internal counter by "1" every time the BD signal is input. That is, each count value of the internal counter is information indicating a corresponding one of the plurality of mirror faces of the rotary polygon mirror 204. The CPU 303 can identify which of the plurality of mirror faces the input image data corresponds to with use of the count value. That is, the CPU 303 can switch a filter coefficient for correcting the input image data with use of the count value.

The memory 302 is configured to store, for each mirror face, position information (first scanning position information) indicating positional deviation amounts from ideal scanning positions in the sub-scanning direction of a plurality of laser beams reflected by the mirror faces of the rotary polygon mirror 204. Further, the memory 302 is configured to store position information (second scanning position information) indicating a positional deviation amount from the ideal scanning position in the sub-scanning direction of the laser beam emitted from each light emitting point. The CPU 303 is configured to read each of the first scanning position information and the second scanning position information. The CPU 303 is configured to calculate the position of each scanning line based on the position information read from the memory 302 and calculate image data taking information for correcting the position of each scanning line into account from the calculated position of each scanning line and the input image data. The PWM signal generating portion 503 of the CPU 303 is configured to convert the image data taking the information for correcting the position of each scanning line into account into drive data. A ROM 309 is configured to store a conversion table for converting image data of 4 bits into drive data of 16 bits as shown in FIG. 20. A vertical axis of the conversion table shown in FIG. 20 represents image data indicating density values of 4 bits, which corresponds to one pixel. A horizontal axis of the conversion table shown in FIG. 20 represents drive data of 16 bits associated with the density values of 4 bits individually. For example, in the case where image data input to the PWM signal generating portion 503 is a bit pattern of "0110", the PWM signal generating portion 503 converts the image data "0110" into drive data that is a bit pattern of "0000000001111111" with use of the conversion table. The PWM signal generating portion 503 outputs the converted drive data in the order of "0000000001111111" serially on a bit basis in accordance with the clock signal (1) described later. When the PWM signal generating portion 503 outputs the drive data, a PWM signal is generated. When the PWM signal generating portion 503 outputs "1", a light emitting point emits a laser beam. When the PWM signal generating portion 503 outputs "0", a light emitting point does not output a laser beam.

<Scanning Position Information>

Next, scanning position information stored in the memory 302 will be described with reference to FIG. 3 and Table 1.

Figure 3:
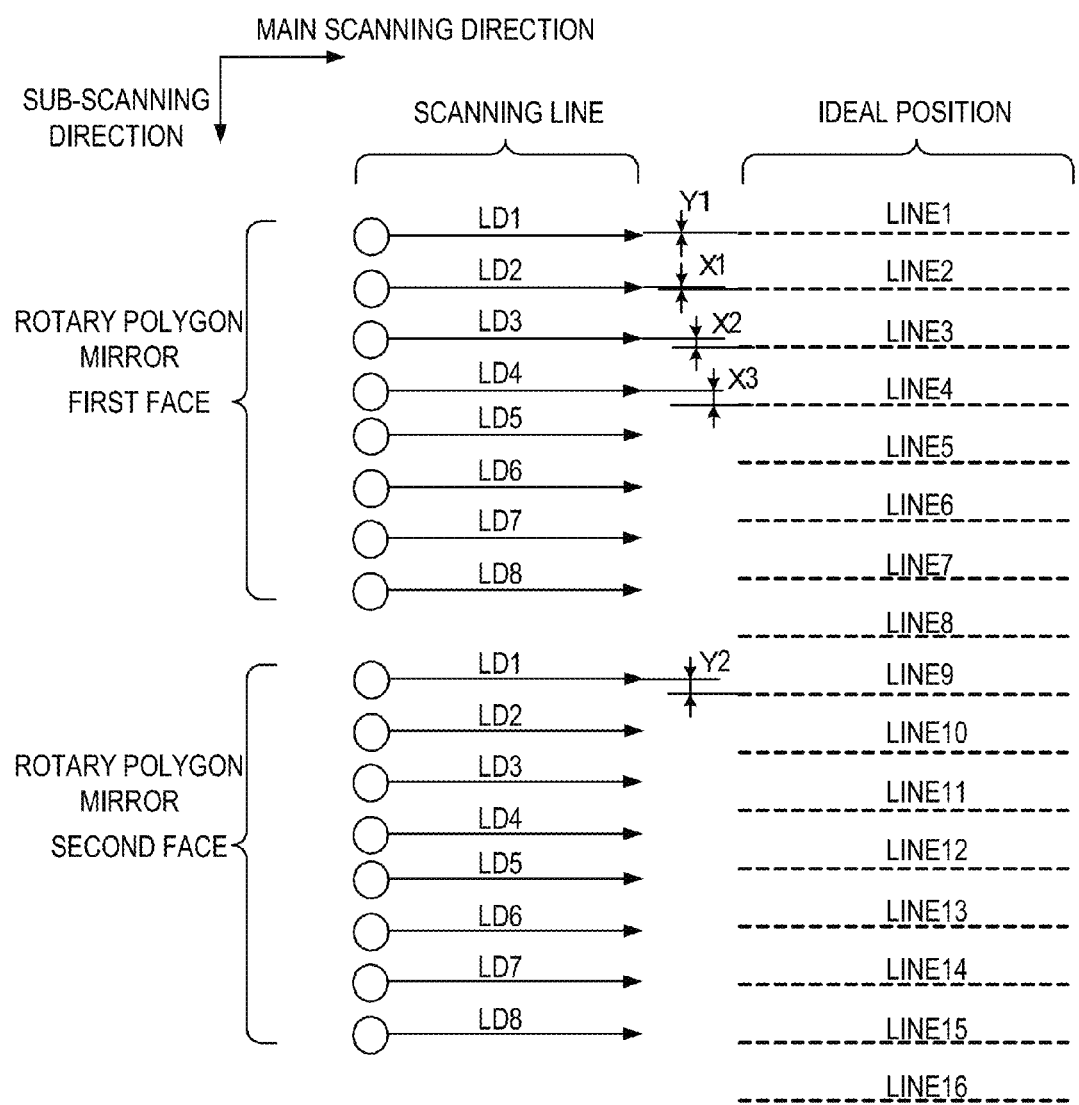
FIG. 3 is a diagram for illustrating positional deviation of scanning lines according to the first and second embodiments.

FIG. 3 is an illustration of a state of positional deviation of each scanning line from an ideal position. Scanning lines scanned by each laser beam of the laser light source having eight light emitting points are denoted by LD1, LD2, LD3, LD4, LD5, LD6, LD7, and LD8. An ideal interval between the respective scanning lines is determined based on a resolution. For example, in the case of an image forming apparatus having a resolution of 1,200 dpi, an ideal interval between the respective scanning lines is 21.16 µm. When the scanning line LD1 is defined as a reference position, ideal distances D2 to D8 of the scanning lines LD2 to LD8 from the scanning line LD1 are calculated by Expression (1).

$$Dn=(n-1)\times 21.16 \text{ µm } (n=2 \text{ to } 8) \quad \text{Expression (1)}$$

For example, the ideal distance D4 from the scanning line LD1 to the scanning line LD4 is 63.48 µm (=(4−1)×21.16 µm).

In this case, an interval between the scanning lines on the photosensitive drum 102 has an error due to an error of arrangement intervals of the plurality of light emitting points and characteristics of a lens. The positional deviation amounts of the scanning line positions of the scanning lines LD2 to LD8 with respect to ideal positions determined based on the ideal distances D2 to D8 are denoted by X1 to X7. Regarding the first face of the rotary polygon mirror 204, for example, the positional deviation amount X1 of the scanning line LD2 is defined as a difference between the ideal position of the scanning line LD2 (hereinafter referred to as "LINE 2", which similarly applies to the other scanning lines) and the actual scanning line. Further, for example, the positional deviation amount X3 of the scanning line LD4 is defined as a difference between the LINE 4 and the actual scanning line.

Due to a variation in manufacturing of each mirror face of the rotary polygon mirror 204, the mirror faces of the rotary polygon mirror 204 are not completely parallel to the rotary shaft, and the rotary polygon mirror 204 has an angle variation for each mirror face. The positional deviation amounts with respect to the ideal positions in each mirror face of the rotary polygon mirror 204 are denoted by Y1 to Y5 when the number of the mirror faces of the rotary polygon mirror 204 is five. In FIG. 3, a deviation amount of the scanning line LD1 from the ideal position (LINE 1) in the first face of the rotary polygon mirror 204 is denoted by Y1, and a deviation amount of the scanning line LD1 from the ideal position (LINE 9) in the second face of the rotary polygon mirror 204 is denoted by Y2.

A mirror face of the rotary polygon mirror 204 is defined as an m-th face, and a positional deviation amount of a scanning line (LDn) by an n-th laser beam from the laser light source is denoted by Zmn. Then, the positional deviation amount Zmn is represented by Expression (2) with use of the positional deviation amounts X1 to X7 of each scanning line and the positional deviation amounts Y1 to Y5 of each mirror face.

$$Zmn=Ym+X(n-1) \ (m=1 \text{ to } 5, n=1 \text{ to } 8) \quad \text{Expression (2)}$$

(Where X(0)=0.)

For example, a positional deviation amount Z14 regarding the scanning line LD4 in the first face of the rotary polygon mirror 204 is determined to be Z14=Y1+X3 by Expression (2). Further, a positional deviation amount Z21 regarding the scanning line LD1 in the second face of the rotary polygon mirror 204 is determined to be Z21=Y2 by Expression (2).

When the positional deviation amount Zmn is calculated by Expression (2), it is only necessary that the number of pieces of data to be used for calculating the positional deviation amount Zmn correspond to the number of the mirror faces of the rotary polygon mirror 204 and the number of light emitting points of the laser light source. An address map of positional deviation data stored in the memory 302 is shown in Table 1.

TABLE 1

| Address | Data |
|---|---|
| 0 | LD2 Position Information X1 |
| 1 | LD3 Position Information X2 |
| 2 | LD4 Position Information X3 |
| 3 | LD5 Position Information X4 |
| 4 | LD6 Position Information X5 |
| 5 | LD7 Position Information X6 |
| 6 | LD8 Position Information X7 |
| 7 | First Face Position Information Y1 |
| 8 | Second Face Position Information Y2 |
| 9 | Third Face Position Information Y3 |
| 10 | Fourth Face Position Information Y4 |
| 11 | Fifth Face Position Information Y5 |

As shown in Table 1, information on the respective positional deviation amounts (described as position information) X1 to X7 of the scanning line LD2 to the scanning line LD8 is stored in from an address 0 to an address 6 of the memory 302. Further, information on the respective positional deviation amounts Y1 to Y5 of the first face to the fifth face of the mirror faces of the rotary polygon mirror 204 is stored in from an address 7 to an address 11 of the memory 302. In the embodiment, description is given on the assumption that the eight scanning lines of each laser beam are deviated uniformly due to the positional deviation of each mirror face of the rotary polygon mirror 204. That is, in the embodiment, twelve pieces of position information are stored in the memory 302. However, when there is a variation in positional deviation amount of each scanning line of a laser beam for each mirror face of the rotary polygon mirror 204, there may be stored information on a positional deviation amount only for a combination of each mirror face of the rotary polygon mirror 204 and each scanning line of the laser beam. That is, in this case, forty pieces of position information are stored in the memory 302 with the number of the mirror faces of the rotary polygon mirror 204 being five, and the number of light emitting points of the laser light source being eight.

(Memory Storage Operation)

As information on a positional deviation amount to be stored in the memory 302, for example, data measured in an adjustment step of the light scanning device 104 in a factory or the like is stored. Further, the image forming apparatus 100 may include a position detection unit configured to detect the position of a scanning line scanned with a laser beam emitted from the laser light source 201 so that the information stored in the memory 302 may be updated in real time. As the position detection unit configured to detect a position of scanning light in the sub-scanning direction, a known technology may be used. For example, a position may be detected by a CMOS sensor or a position sensitive detector (PSD) arranged in the light scanning device 104 or arranged on a scanning path of a laser beam near the photosensitive drum 102. Further, a triangular slit may be formed in a surface of a photo diode (PD) arranged in the light scanning device 104 or arranged near the photosensitive drum 102, to thereby detect a position from an output pulse width of the PD.

Figure 4:
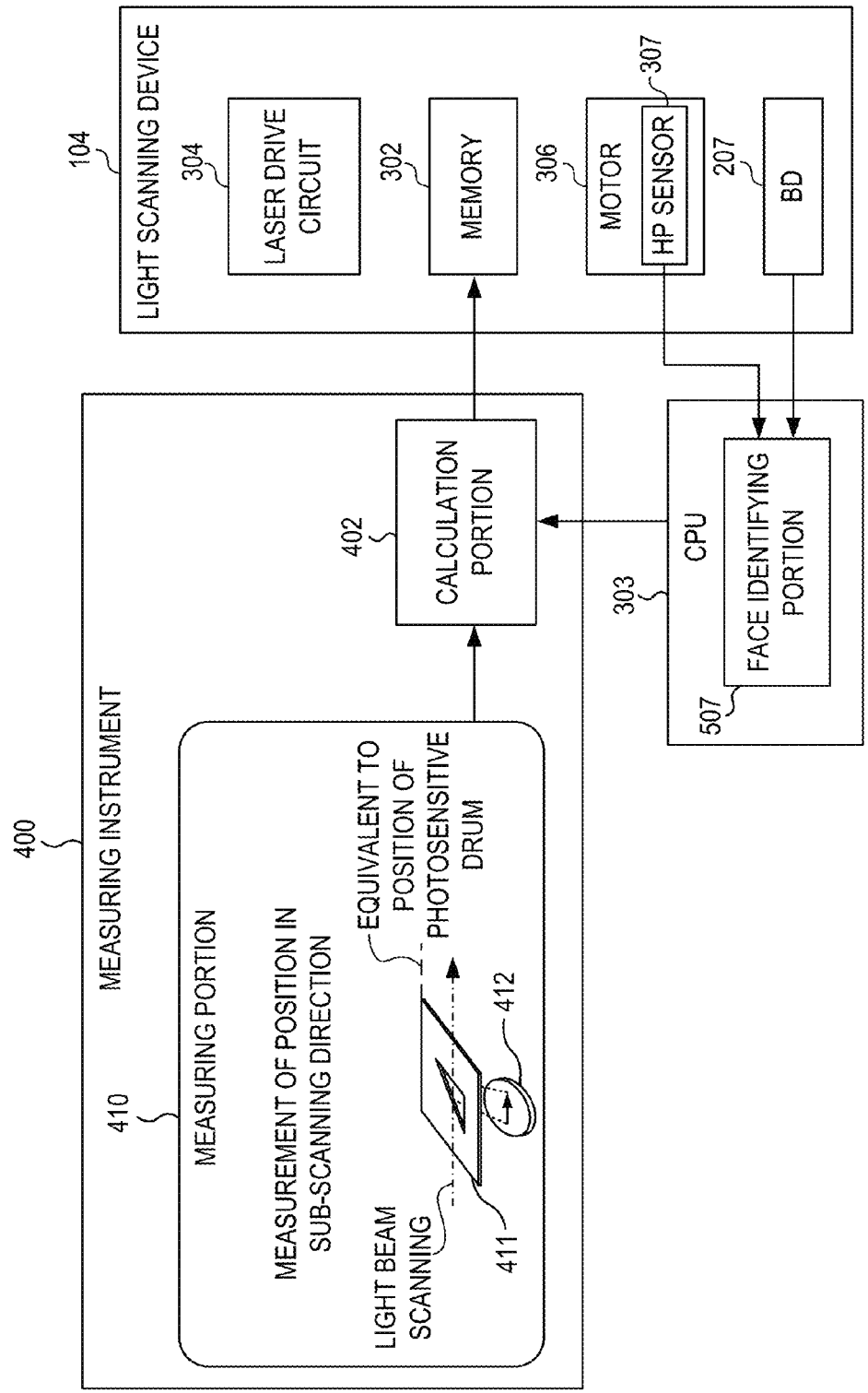
FIG. 4 is a block diagram for illustrating a step of storing information in a memory according to the first and second embodiments.

FIG. 4 is a block diagram for illustrating a step of storing information in the memory 302 of the light scanning device 104 in a factory or the like as an example. The same configurations as those of FIG. 2 are denoted by the same reference symbols as those therein, and the description thereof is omitted. In the adjustment step for the light scanning device 104, a measuring instrument 400 is arranged at a position corresponding to the scanning position on the photosensitive drum 102 when the light scanning device 104 is mounted on the image forming apparatus 100. The measuring instrument 400 includes a measuring portion 410 and a calculation portion 402, and the calculation portion 402 is configured to receive a face synchronization signal from the face identifying portion 507 of the CPU 303 of FIG. 2. In the CPU 303 of FIG. 4, only the face identifying portion 507 is illustrated. First, a laser beam is radiated to the measuring portion 410 from the light scanning device 104. The measuring portion 410 includes a triangular slit 411 and a PD 412. A laser beam emitted from the light scanning device 104 indicated by the arrow with the alternate long and short dash line in FIG. 4 scans the triangular slit 411. The measuring portion 410 measures the position in the sub-scanning direction of a scanning line based on information on the laser beam input to the PD 412 through the triangular slit 411. The measuring portion 410 outputs information on the measured position in the sub-scanning direction of the scanning line in each mirror face (hereinafter referred to as "data for each face") of the rotary polygon mirror 204 to the calculation portion 402.

Meanwhile, the face identifying portion 507 is configured to receive the HP signal from the HP sensor 307 of the light scanning device 104 and receive the BD signal from the BD 207. With this, the face identifying portion 507 is configured to identify a mirror face of the rotary polygon mirror 204 and output information on the identified mirror face to the calculation portion 402 as a face synchronization signal. The calculation portion 402 is configured to write the information on the position in the sub-scanning direction of the scanning line measured by the measuring portion 410 into an address on the memory 302 of the light scanning device 104 in accordance with the information on the mirror face of the rotary polygon mirror 204 input from the face identifying portion 507. Thus, the information on the positional deviation amounts of the scanning lines caused by a variation in intervals between the eight light emitting points of the laser light source 201 (X1 to X7) and the information on the positional deviation amounts of the scanning lines caused by an optical face tangle error of the mirror face of the rotary polygon mirror 204 (Y1 to Y5) are stored in the memory 302.

<Calculation Method for Positional Deviation Amount>

Figure 5:
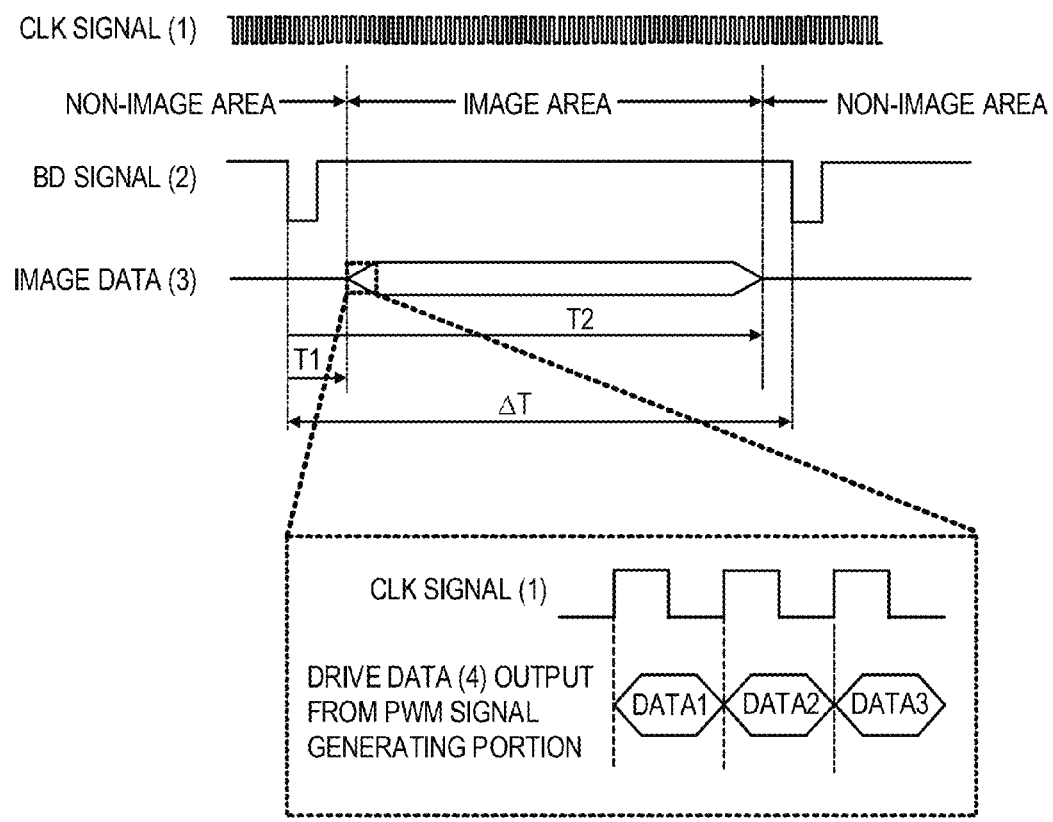
FIG. 5 is a time chart for illustrating one scanning period according to the first and second embodiments.

FIG. 5 is an illustration of control timing in one scanning period of a laser beam in the embodiment. (1) represents a CLK signal corresponding to a pixel period per divided pixel (1/16 pixel) obtained by dividing one pixel by 16, and (2) represents input timing of the BD signal from the BD 207 to the CPU 303. (3) and (4) are each an illustration of timing at which the CPU 303 outputs drive data (DATA1, DATA2, etc.). (4) represents drive data after the filtering.

With the BD signal output from the BD 207 being a reference, during a period of time from timing at which the BD signal is input to the CPU 303 to timing at which a subsequent BD signal is input to the CPU 303, a period of time from timing at which the BD signal is input to the CPU 303 to timing at which the processing of the image data input to the CPU 303 is started is defined as T1. Further, during the period of time from timing at which the BD signal is input to the CPU 303 to timing at which a subsequent BD signal is input to the CPU 303, a period of time from timing at which the BD signal is input to the CPU 303 to timing at which the output of the image data input to the CPU 303 is completed is defined as T2. After the BD signal is input to the CPU 303, the CPU 303 stands by until the predetermined period of time T1 elapses. Then, the CPU 303 starts the filtering of the input image data in synchronization with the clock signal CLK(2) to generate drive data successively from the processed image data and output the drive data on a bit basis, to thereby output the PWM signal to the laser drive circuit 304. Then, after the predetermined period of time T2 elapses from the input of the BD signal, the CPU 303 finishes the processing of the image data in one scanning line. The CPU 303 calculates, for each scanning, a positional deviation amount of the scanning line in the scanning period until the predetermined period of time T1 elapses from the detection of the BD signal, that is, while the laser beam scans a non-image area. Then, the CPU 303 causes the filter coefficient setting portion 594 to set a filter coefficient based on the calculated positional deviation amount. Then, the CPU 303 causes, for each scanning, the filtering portion 501 to correct the image data with use of the filter coefficient set by the filter coefficient setting portion 504 until the predetermined period of time T2 elapses from the elapse of the predetermined period of time T1.

In the embodiment, the CPU 303 uses a filter, which is set based on the positional deviation amount calculated for each scanning line, to perform the filter operation for the image data of a plurality of scanning lines. Therefore, in the above-mentioned positional deviation amount calculation operation, the CPU 303 is configured to determine positional deviation amounts of a plurality of scanning lines to be used in the filter operation during a period in which the period of time T1 elapses from the output of the BD signal from the BD 207. For example, when the range of the filter operation is defined as L=3, image data on three pixels upward and downward from a line of interest is referred to, and a positional deviation amount of each scanning line within the range of the three pixels upward and downward from the line of interest is calculated, to thereby perform the filter operation.

In this case, the positional deviation amount of the scanning line corresponding to the line of interest is calculated during a period immediately before image formation. Further, the calculation results of the positional deviation amounts calculated before are used for the scanning lines scanned before the scanning line of interest. For a scanning line to be scanned at timing after the scanning line of interest, a positional deviation amount B is determined based on the face information of the rotary polygon mirror 204 corresponding to the next scanning line and the beam position information. Further, a rotation speed Vp of the rotary polygon mirror 204 and a rotation speed Vd of the photosensitive drum 102 are determined by predicting each speed in a next scanning line based on a value detected at previous scanning timing and a value detected at current scanning timing. The details of the calculation method for a positional deviation amount will be described later.

(First Correction of Image Data)

Figure 6:
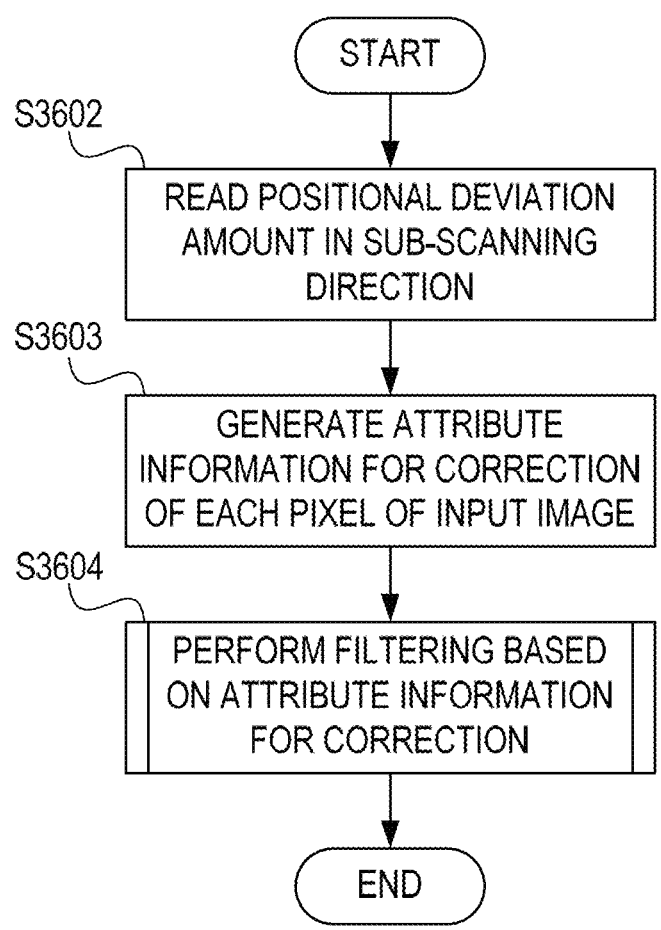
FIG. 6 is a flowchart for illustrating correction processing according to the first embodiment.

In the embodiment, the CPU 303 is configured to correct image data based on the positional deviation amounts in the sub-scanning direction of the scanning lines formed by laser beams and output the corrected image data to the laser drive circuit 304. Now, a flowchart of FIG. 6 will be described below. FIG. 6 is a flowchart for illustrating first correction processing for correcting uneven image density and banding caused by the positional deviation in the sub-scanning direction. In Step S3602, the CPU 303 reads the positional deviation amount in the sub-scanning direction stored in the memory 302. Specifically, the CPU 303 reads the position information X1 to X7 of the scanning lines LD2 to LD 8 and the position information Y1 to Y5 of the first to fifth faces of the rotary polygon mirror 204 shown in Table 1 from the memory 302. In the embodiment, the pixel position in the sub-scanning direction of the input image data is corrected based on the positional deviation amount in the sub-scanning direction, followed by the filtering, to thereby output pixel data, that is, density. The first correction processing according to the embodiment involves correcting sparseness and denseness of density in the sub-scanning direction caused by deviation of a scanning line in the sub-scanning direction by moving a pixel of interest in the sub-scanning direction in accordance with the deviation of the scanning line. Further, the first correction processing involves correcting the sparseness and denseness of density by causing a pixel value of the pixel of interest to be output (black dots in a broken line circle A of FIG. 15C) or not to be output (white dots in a broken line circle B of FIG. 15C) depending on the movement in the sub-scanning direction.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the scanning positions on the photosensitive drum 102 are dense with respect to the ideal scanning positions, and a case (d) in which the scanning positions on the photosensitive drum 102 are sparse with respect to the ideal scanning positions. Specific examples of the state of positional deviation in the sub-scanning direction are illustrated in FIG. 7A, FIG. 7B, FIG. 7C, and FIG. 7D. In FIG. 7A to FIG. 7D, the broken lines represent scanning positions, and in FIG. 7A to FIG. 7D, (1) to (5) represent the order of scanning. In the embodiment, eight beams are used for scanning simultaneously, but description is given on the assumption that the order is allocated to each beam arranged successively in the sub-scanning direction. Each column on the left side of FIG. 7A to FIG. 7D represents ideal scanning positions, and each column on the right side represents scanning positions on the photosensitive drum 102. S1 to S5 represent positional deviation amounts from the ideal scanning positions with respect to scanning numbers (1) to (5). The unit of a positional deviation amount is represented based on the case where the ideal beam interval (21.16 μm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

FIG. 7A is an illustration of an example in which the scanning positions on the photosensitive drum 102 are shifted by 0.2 uniformly in the advance direction from the ideal scanning positions. The positional deviation amount as illustrated in FIG. 7A is hereinafter referred to as a shift amount of +0.2. FIG. 7B is an illustration of an example in which the scanning positions on the photosensitive drum 102 are shifted by 0.2 uniformly in the return direction from the ideal scanning positions. The positional deviation amount as illustrated in FIG. 7B is hereinafter referred to as a shift amount of −0.2. In FIG. 7A and FIG. 7B, the scanning positions are shifted uniformly, and hence the interval between the scanning positions on the photosensitive drum 102 is 1 in both the cases.

In FIG. 7C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 7C, the interval between the scanning positions is 0.8, which is smaller than 1. The state of positional deviation as illustrated in FIG. 7C is hereinafter referred to as being dense at an interval of a (1+0.2) line.

In FIG. 7D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 7D, the interval between the scanning positions is 1.2, which is larger than 1. The state of positional deviation as illustrated in FIG. 7D is hereinafter referred to as being sparse at an interval of a (1+0.2) line.

In the dense state as illustrated in FIG. 7C, positional deviation occurs, and in addition, the scanning positions are dense to cause pixels to be arranged densely on the photosensitive drum 102, with the result that a pixel value per predetermined area increases, to thereby increase density. In contrast, in the sparse state as illustrated in FIG. 7D, positional deviation occurs, and in addition, the scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. Further, when the dense or sparse state occurs alternately as illustrated in FIG. 7C and FIG. 7D, a periodic shading causes moire, which is liable to be detected visually even at the same amount depending on a space frequency.

Referring back to the flowchart of FIG. 6, in Step S3603, the CPU 303 generates attribute information for correction of each pixel of an input image with the correction value setting portion 506. In the embodiment, the pixel position in the sub-scanning direction of an input image is subjected to coordinate transformation in advance and interpolated, thereby being capable of correcting positional deviation and correcting local shading simultaneously while maintaining density of the input image. The attribute information for correction specifically refers to a correction value C described later.

(Coordinate Transformation)

A method for coordinate transformation according to the embodiment will be described with reference to FIG. 8A, FIG. 8B, FIG. 9A, FIG. 9B, FIG. 9C, FIG. 9D, FIG. 10A, and FIG. 10B. In each graph of FIG. 8A to FIG. 10B, a horizontal axis represents a pixel number n, and a vertical axis represents a pixel position (which is also a scanning position) y (y' after the coordinate transformation) in the sub-scanning direction, with the unit being a line. Further, FIG. 8A and FIG. 8B correspond to FIG. 7A and FIG. 7B, respectively. FIG. 10A and FIG. 10B correspond to FIG. 7C and FIG. 7D, respectively. Each graph on the left side of FIG. 8A, FIG. 8B, FIG. 10A, and FIG. 10B represents the state before the coordinate transformation, and each graph on the right side thereof represents the state after the coordinate transformation for the y-axis. Square dots plotted in each graph represent scanning positions on the photosensitive drum 102, and circular dots therein represent ideal scanning positions.

(Case of being Shifted in Advance Direction and Return Direction)

Figure 8A:
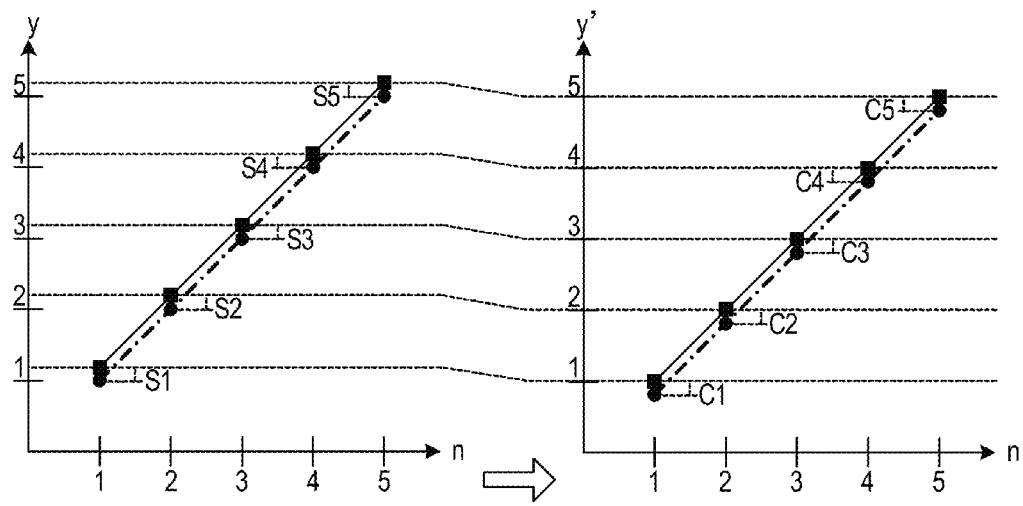
FIG. 8A and FIG. 8B are each a graph for showing coordinate transformation of pixel positions in a sub-scanning direction according to the first and second embodiments.
Figure 9A:
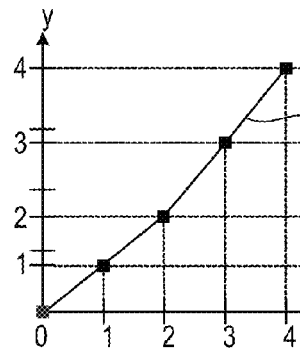
FIG. 9A, FIG. 9B, FIG. 9C, and FIG. 9D are each a graph for showing coordinate transformation of pixel positions in the sub-scanning direction according to the first and second embodiments.

The graph on the left side of FIG. 8A is first described. In the graph before the coordinate transformation, at the ideal scanning positions plotted with the circular dots, for example, a pixel position "y" in the sub-scanning direction is 2 with respect to the pixel number 2. Thus, the y-coordinate of the pixel position "y" is equal to that of the pixel number "n", and the ideal scanning positions are represented by a straight line (indicated by the alternate long and short dash line) with a gradient of 1. The straight line of the alternate long and short dash line is represented by Expression (3).

$$y=n \qquad \text{Expression (3)}$$

As illustrated in FIG. 7A, the scanning positions plotted with the square dots are shifted by S(=0.2) line in the advance direction (+ direction of y-axis) with respect to the ideal scanning positions plotted with the circular dots. Therefore, the scanning positions plotted with the square dots are represented by a straight line (indicated by the solid line) offset with the gradient being 1, which is represented by Expression (4).

$$y=n+S \qquad \text{Expression (4)}$$

In the embodiment, the coordinate transformation is performed so that the actual scanning positions are transformed into the ideal scanning positions. Therefore, in the example illustrated in FIG. 8A, it is only necessary that the coordinate transformation be performed with use of Expression (5). In Expression (5), C represents a correction amount.

$$y'=y+C \qquad \text{Expression (5)}$$

Thus, the correction amount C is represented by a shift amount S and Expression (6).

$$C=-S \qquad \text{Expression (6)}$$

Through Expression (5) of the coordinate transformation and Expression (6) for determining the correction amount C, Expressions (3) and (4) are converted as represented by Expressions (7) and (8), respectively.

$$y'=y+C=n+(-S)=n-S \qquad \text{Expression (7)}$$

$$y'=y+C=(n+S)+C=(n+S)+(-S)=n \qquad \text{Expression (8)}$$

Figure 8B:
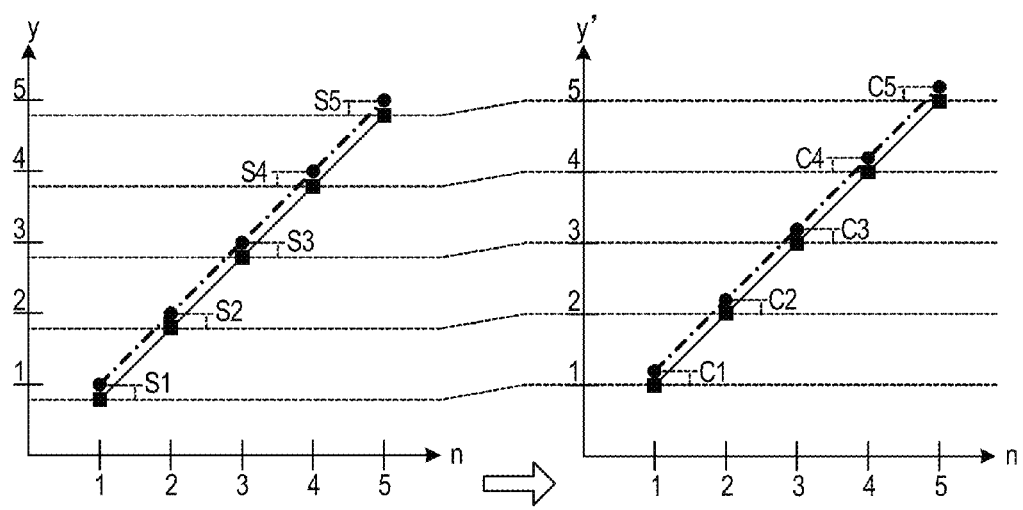

In FIG. 8B, when the shift amount S is defined as −0.2, Expression (8) similarly holds from Expression (3), and the similar description to that of FIG. 8A can be given. As illustrated in FIG. 8A and FIG. 8B, when the scanning lines are not sparse or dense, and are shifted in the advance direction or the return direction, a straight line has a predetermined gradient before and after the coordinate transformation.

(Case in which Dense or Sparse State Occur)

Now, the coordinate transformation will be described, which is also applicable to the cases in FIG. 10A and FIG. 10B in which the scanning positions become dense or sparse, and the cases of combinations of FIG. 8A, FIG. 8B, FIG. 10A, and FIG. 10B in which a shift and a dense or sparse state occur. FIG. 9A is an illustration of a relationship between the pixel number and the scanning position, and a horizontal axis represents a pixel number n, and a vertical axis y represents a scanning position in the sub-scanning direction, square dots being plotted as the scanning positions on the photosensitive drum 102. In FIG. 9A, the case is described in which the scanning lines are dense on the photosensitive drum 102 within a range of the pixel number of n≤2, and the scanning lines are sparse on the photosensitive drum 102 within a range of the pixel number of n≥2.

As illustrated in FIG. 9A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the straight line has a curved shape at the pixel number of n=2. In FIG. 9A, a function indicating a change in scanning positions passing through the square dots is defined as ft(n) and is represented by the solid line. The function ft(n) representing the scanning positions is represented by Expression (9).

$$y=ft(n) \qquad \text{Expression (9)}$$

Next, when a function after the coordinate transformation of the y-axis that represents the scanning positions in the sub-scanning direction is defined as ft'(n), the function ft'(n) representing the scanning positions after the coordinate transformation is represented by Expression (10).

$$y'=ft'(n) \qquad \text{Expression (10)}$$

In the embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (11).

$$ft'(n)=n \qquad \text{Expression (11)}$$

Expression (11) means that, for example, a pixel position y' (=ft'(2)) in the sub-scanning direction after the coordinate transformation becomes 2 with respect to the pixel number 2.

Figure 9B:
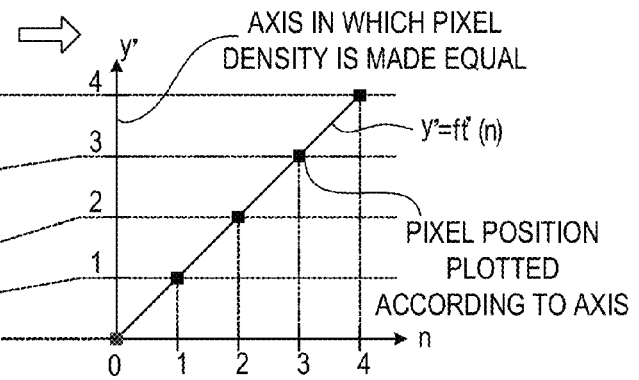
Figure 9C:
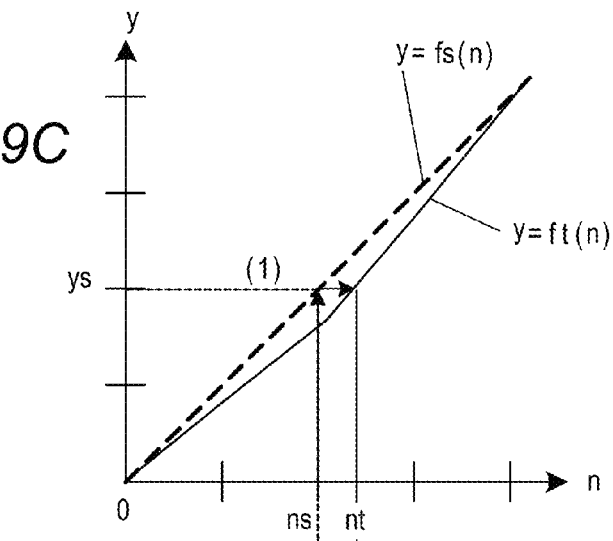
Figure 9D:
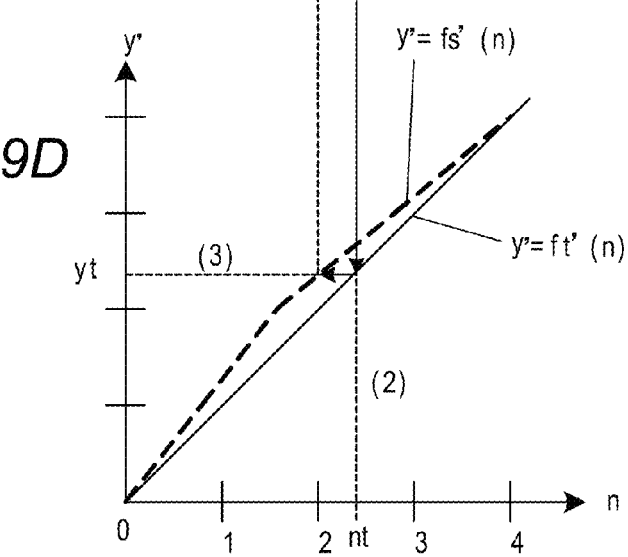
Figure 10A:
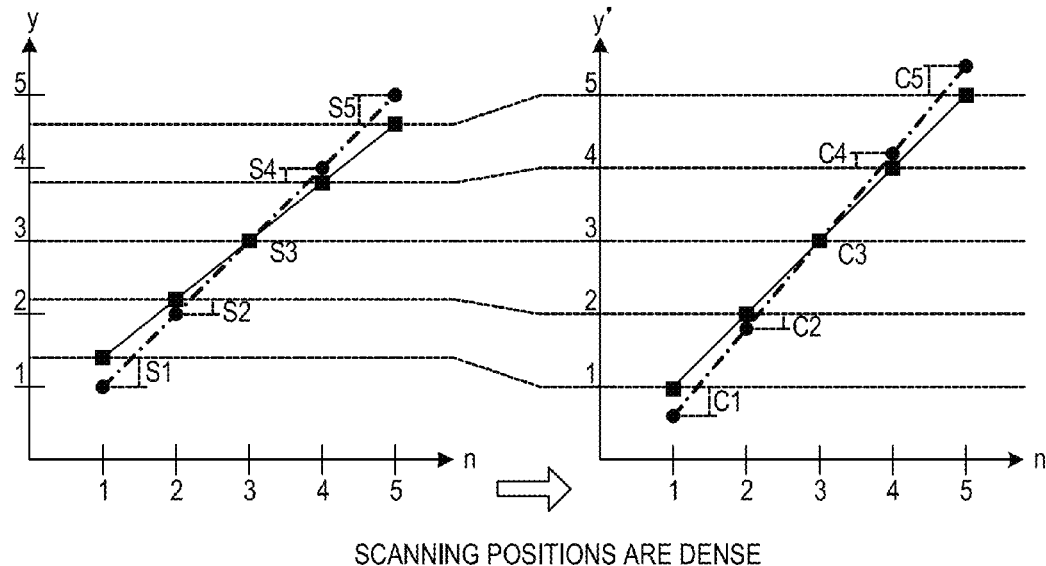
FIG. 10A and FIG. 10B are each a graph for showing coordinate transformation of pixel positions in the sub-scanning direction according to the first and second embodiments.
Figure 10B:
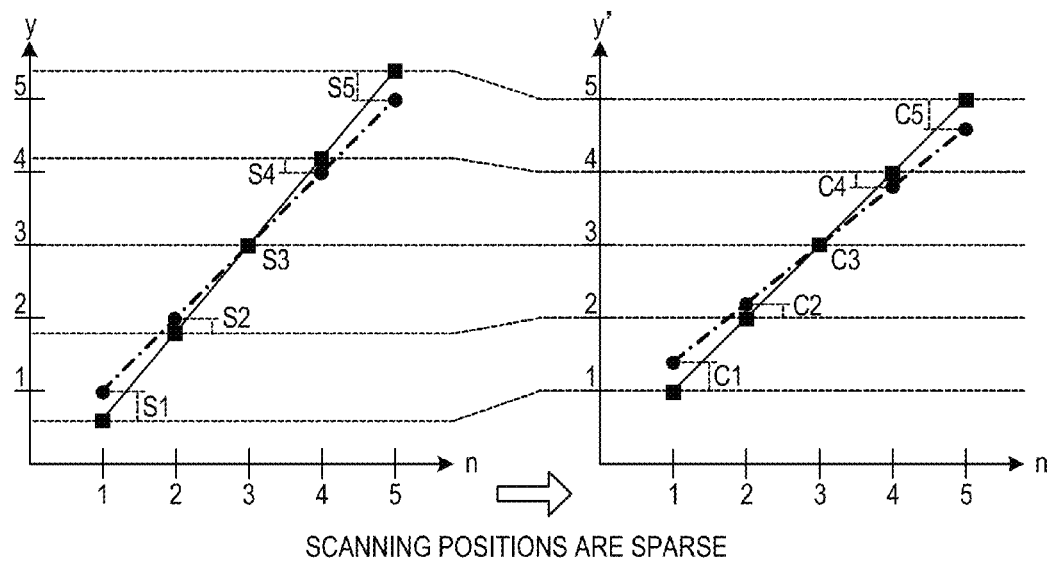

The broken lines connecting FIG. 9A and FIG. 9B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 9A and FIG. 9B will be described with reference to FIG. 9C and FIG. 9D. In the same manner as in FIG. 9A and FIG. 9B, a horizontal axis in FIG. 9C and FIG. 9D represents a pixel number "n", and a vertical axis "y" (or y') represents scanning positions in the sub-scanning direction. FIG. 9C is an illustration before the coordinate transformation, and FIG. 9D is an illustration after the coordinate transformation. A relationship between the pixel number and the coordinate position "y" of the input image data will be described below. First, the broken line of FIG. 9C represents a function fs(n) representing ideal scanning positions before the coordinate transformation and is represented by Expression (12).

$$y=fs(n) \qquad \text{Expression (12)}$$

Further, in the embodiment, the interval between the pixels in the sub-scanning direction of the input image data is uniform, and hence the function fs(n) is represented by Expression (13).

$$fs(n)=n \qquad \text{Expression (13)}$$

A scanning position of the y'-coordinate after the coordinate transformation of a pixel number of interest ns of the input image data is determined through three steps described below. In the first step, when the y-coordinate of an ideal scanning position corresponding to the pixel number ns of the input image data is defined as "ys", "ys" can be determined by Expression (14).

$$ys=fs(ns) \qquad \text{Expression (14)}$$

A pixel number "nt" in which the scanning position before the coordinate transformation is the same on the photosensitive drum 102 (solid line) is determined ((1) of FIG. 9C). The scanning position on the photosensitive drum 102 is represented by the function y=ft(n), and a relationship of ys=ft(nt) holds. When an inverse function of the function ft(n) is defined as $ft^{-1}(y)$, the pixel number nt is represented by Expression (15).

$$nt=ft^{-1}(ys) \qquad \text{Expression (15)}$$

In the second step, the y'-coordinate after the coordinate transformation (defined as "yt") corresponding to the pixel number "nt" of the scanning position on the photosensitive drum 102 is determined by Expression (16) with use of the function ft'(n) after the coordinate transformation ((2) of FIG. 9D).

$$yt=ft'(nt) \qquad \text{Expression (16)}$$

The pixel number ns holds even when any number is selected, and hence an expression for determining the position "yt" of the y'-coordinate after the coordinate transformation based on the pixel number ns corresponds to the function fs'(n) for determining the y'-coordinate in calculation based on the pixel number n of the input image data. Thus, a general expression represented by Expression (17) is derived from Expressions (14) to (16). A function indicating the ideal scanning position represented by the broken line after the coordinate transformation is represented by y'=fs'(n) ((3) of FIG. 9D).

$$yt=fs'(ns)=ft'(nt)=ft'(ft^{-1}(ys))=ft'(ft^{-1}(fs(ns)))$$

"ns" is generalized into "n" to obtain Expression (17).

$$fs'(n)=ft'(ft^{-1}(fs(n))) \qquad \text{Expression (17)}$$

Further, Expression (13) and Expression (11) in which the pixel interval of the input image data and the interval of the scanning positions after the coordinate transformation are set to be uniform, with the distance of 1, are substituted into Expression (17). Then, Expression (17) is represented by Expression (18) with use of the inverse function $ft^{-1}(n)$ of the function ft(n) for deriving the scanning position from the pixel number "n".

$$fs'(n)=ft^{-1}(n) \qquad \text{Expression (18)}$$

Expression (4) in which the scanning positions are shifted uniformly in the advance direction and the return direction as illustrated in FIG. 8A and FIG. 8B, and Expression (7) for determining a position after the coordinate transformation of the input image data also have an inverse function relationship, and it can be confirmed that Expression (18) holds. Further, when applied to the case in which the dense or sparse state occurs in scanning positions as illustrated in FIG. 10A and FIG. 10B, the function "y" representing scanning positions before the coordinate transformation is represented by Expression (19) when the function "y" is a straight line with a gradient "k", passing through (n0, y0).

$$fs(n)=y=k\times(n-n0)+y0 \qquad \text{Expression (19)}$$

In order to determine a pixel position after the coordinate transformation of the y-axis of the input image data, it is only necessary that an inverse function $((1/k)\times(y-y0)+n0)$ be determined by Expressions (17) and (18), and the pixel number "n" be substituted into the inverse function, and hence Expression (20) is derived.

$$y'=(1/k)\times(n-y0)+n0 \qquad \text{Expression (20)}$$

When the scanning lines illustrated in FIG. 10A are dense, and the scanning lines illustrated in FIG. 10B are sparse, the positions of the scanning lines on the photosensitive drum 102 after the coordinate transformation can be represented by Expression (20) in both the cases. Further, a correction value Cn of the pixel number n is determined by Cn=fs'(n)−fs(n).

Specifically in FIG. 10A, n0=y0=3 and k=0.8 are satisfied, and Expression (21) is obtained.

$$fs'(n)=(1/0.8)\times(n-3)+3 \qquad \text{Expression (21)}$$

For example, in the pixel number 3, fs'(3)=3.00 is satisfied, and the correction value C3 is 0.00 (=3.00-3.00). Further, in the pixel number 5, fs'(5)=5.50 is satisfied, and the correction value C5 is +0.50 (=+5.50-5.00). The correction values C1 to C5 when the scanning positions are dense are illustrated in FIG. 12C.

Further, in FIG. 10B, n0=y0=3, and k=1.2 are satisfied, and Expression (22) is obtained.

$$fs'(n)=(1/1.2)\times(n-3)+3 \qquad \text{Expression (22)}$$

For example, in the pixel number 3, fs'(3)=3.000 is satisfied, and the correction value C3 is 0.000 (=3.000-3.000). Further, in the pixel number 5, fs'(5)=4.667 is satisfied, and the correction value C5 is −0.333 (=4.667-5.000). The correction values C1 to C5 when the scanning positions are sparse are illustrated in FIG. 12D.

Further, even when a dense or sparse state and a shift are mixed in the scanning lines, an ideal scanning position after the coordinate transformation can be determined with use of Expression (17) or (18). The correction value setting portion 506 is configured to subject an ideal scanning position to the coordinate transformation based on a positional deviation amount to determine the correction value Cn, and output information on the correction value Cn to the filter coefficient setting portion 504.

(Filtering)

In the embodiment, the filtering is performed in order to generate correction data. In the embodiment, the filtering portion 501 is configured to perform the filtering through a convolution operation based on the following filter function. That is, the filtering portion 501 performs the filtering based on a positional relationship between the pixel positions in the sub-scanning direction of pixels obtained by correcting scanning positions in the sub-scanning direction of pixels of the input image data, and the sub-scanning positions of pixels having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 11A:
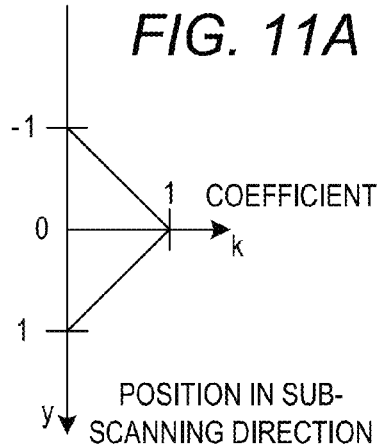
FIG. 11A, FIG. 11B, and FIG. 11C are each a graph for showing a convolution function to be used in filtering according to the first and second embodiments.
Figure 11B:
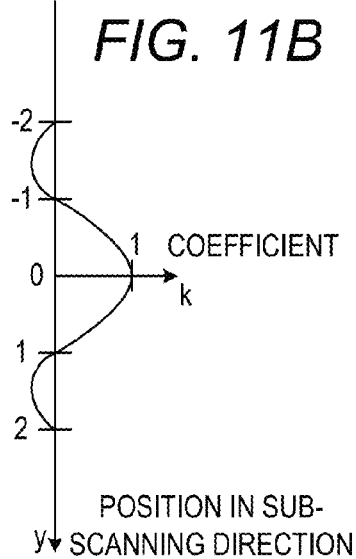
Figure 11C:
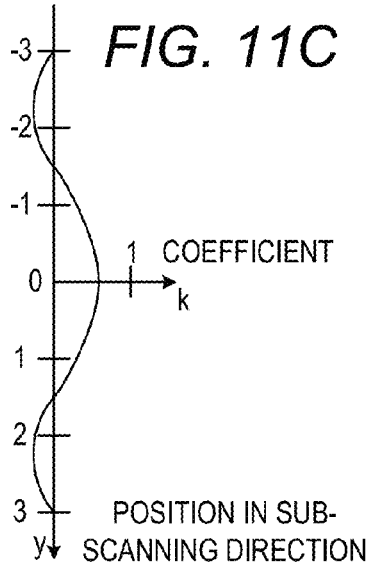

The convolution function according to the embodiment can be selected from linear interpolation illustrated in FIG. 11A, and bicubic interpolation illustrated in FIG. 11B and FIG. 11C. The filter function output portion 505 outputs information on the convolution function used in the filtering to the filter coefficient setting portion 504 as information of the table, for example. In FIG. 11A to FIG. 11C, a vertical axis "y" represents a position in the sub-scanning direction, with a unit being a pixel, and a horizontal axis "k" represents a magnitude of a coefficient. Although the unit of the vertical axis "y" is set to a pixel, a line may be used as a unit because the sub-scanning direction is illustrated.

An expression of FIG. 11A is represented by Expression (23).

$$k = y+1 \quad (-1 \leq y \leq 0)$$

$$k = -y+1 \quad (0 < y \leq 1)$$

$$0 \quad (y < -1, y > 1) \quad \text{Expression (23)}$$

Expressions of FIG. 11B and FIG. 11C are represented by the following two expressions.

$$\text{bicubic}(t) = \begin{cases} (a+2)|t|^3 - (a+3)|t|^2 + 1 & (|t| \leq 1) \\ a|t|^3 - 5a|t|^2 + 8a|t| - 4a & (1 < |t| \leq 2) \\ 0 & (2 < |t|) \end{cases} \quad \text{Expression (24)}$$

$$k = \text{bicubic}\left(\frac{y}{w}\right) / w \quad \text{Expression (25)}$$

In the embodiment, "a" is set to −1, and "w" is set to 1 in FIG. 11B and set to 1.5 in FIG. 11C, but "a" and "w" may be adjusted in accordance with the electrophotographic characteristics of each image forming apparatus. The filter coefficient setting portion 504 is configured to output a coefficient ("k" described later) to be used in the filtering to the filtering portion 501 based on the information on the filter function obtained from the filter function output portion 505 and the information on the correction value C output from the correction value setting portion 506.

Figure 11D:
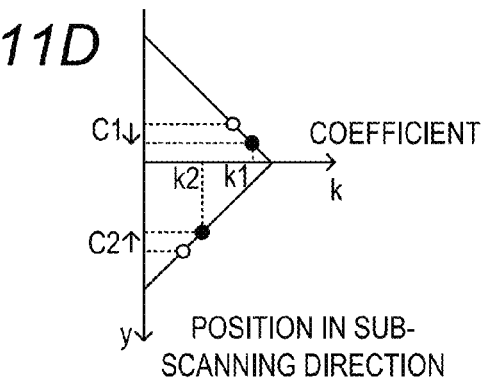
FIG. 11D is a graph for showing a correction value and a coefficient.

Now, description is given with reference to FIG. 11D. In FIG. 11D, a horizontal axis represents a coefficient "k" to be used in the filtering, and a vertical axis represents a position "y" in the sub-scanning direction. When the filter coefficient setting portion 504 receives the correction value Cn from the correction value setting portion 506, the filter coefficient setting portion 504 determines a coefficient "kn" corresponding to the correction value Cn with use of the filter function input from the filter function output portion 505. White circles of FIG. 11D represent coefficients before the coordinate transformation. Further, in FIG. 11D, it is illustrated that coefficients k1 and k2 were set with respect to a correction value C1 and a correction value C2, respectively, as coefficients "kn" to be used in the filtering (black circles). In the embodiment, the same convolution function is applied irrespective of whether the input image data is dense or sparse, and sampling is performed at an ideal scanning position, to thereby store density per predetermined area of the input image data.

(Specific Example of Filtering)

A specific example of performing the filtering with use of the convolution operation with a filter function by linear interpolation of Expression (23) based on a coordinate position after the coordinate transformation of the embodiment will be described with reference to FIG. 12A, FIG. 12B, FIG. 12C, and FIG. 12D. The filtering using the convolution operation is performed by the filtering portion 501. FIG. 12A to FIG. 12D correspond to FIG. 7A to FIG. 7D. Each column on the left side of FIG. 12A to FIG. 12D represents input pixels after the above-mentioned coordinate transformation. Further, each column on the right side of FIG. 12A to FIG. 12D represents scanning positions on the photosensitive drum 102 after the above-mentioned coordinate transformation. That is, the scanning positions in each column on the right side of FIG. 12A to FIG. 12D have been subjected to the coordinate transformation so as to have a uniform interval and a distance of 1.

More specifically, the scanning positions in the sub-scanning direction of input pixels after the coordinate transformation are represented by a straight line (y'=fs'(n)) indicated by the alternate long and short dash line of the graph after the coordinate transformation illustrated on the right side of FIG. 8A, FIG. 8B, FIG. 10A, and FIG. 10B. The scanning positions on the photosensitive drum 102 after the coordinate transformation are represented by a straight line (y'=fs'(n)) indicated by the solid line of the graph after the coordinate transformation illustrated on the right side of FIG. 8A, FIG. 8B, FIG. 10A, and FIG. 10B. For example, in FIG. 8A, the shift amount is +0.2 (=S), and hence fs'(n)=y−0.2=n−0.2 is satisfied after the coordinate transformation.

Further, in FIG. 12A to FIG. 12D, the magnitude of a pixel value, that is, a density value is represented by shading of circles. Further, numbers in parentheses indicate numbers of scanning lines, and are the same as the pixel numbers illustrated in FIG. 7A to FIG. 7D. In each graph at the center of FIG. 12A to FIG. 12D, a horizontal axis represents density, and a vertical axis represents a position in the sub-scanning direction. The convolution operation involves developing waveforms W (W1 to W5 with respect to the pixels (1) to (5)) obtained by multiplying the filter function based on each coordinate position of an input image (FIG. 11A) by a pixel value, and adding the waveforms W by superimposing.

Figure 12A:
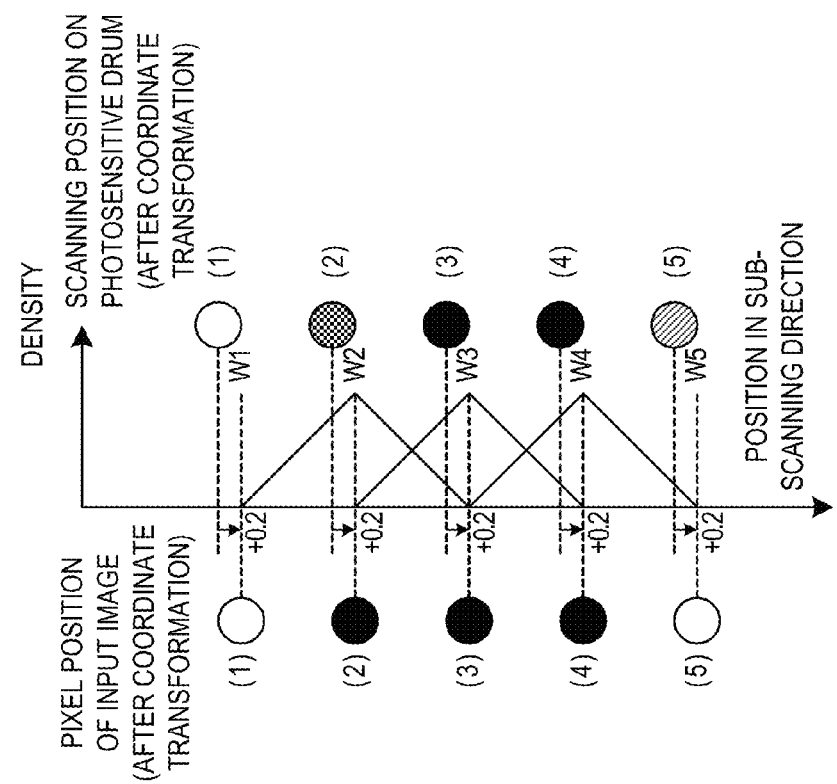
FIG. 12A, FIG. 12B, FIG. 12C, and FIG. 12D are each a diagram for illustrating the filtering for each classification of positional deviation according to the first and second embodiments.

FIG. 12A will be described first. The pixels (1) and (5) represented by white circles have a density of 0, that is, a pixel value of 0. Therefore, W1 and W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution operation is a sum (ΣWn, n=1 to 5) of all the waveforms.

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1.

Figure 12B:
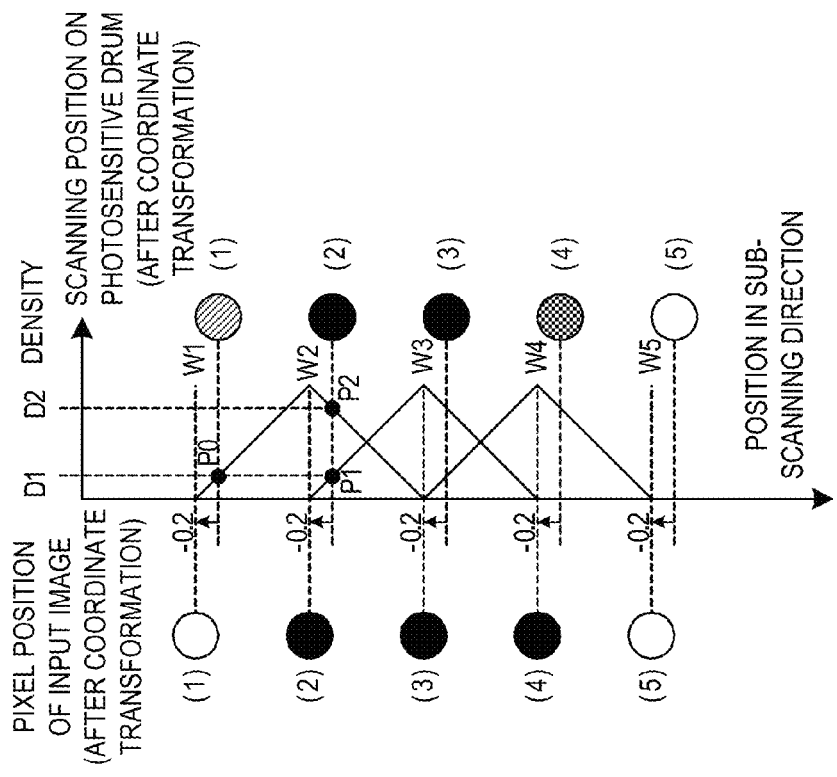
Figure 12C:
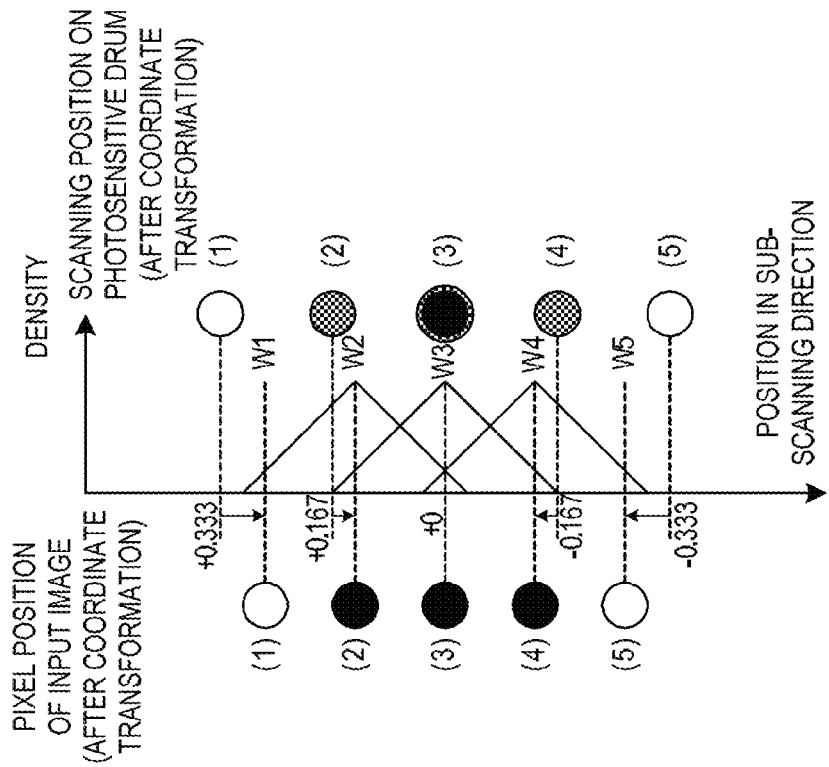
Figure 12D:
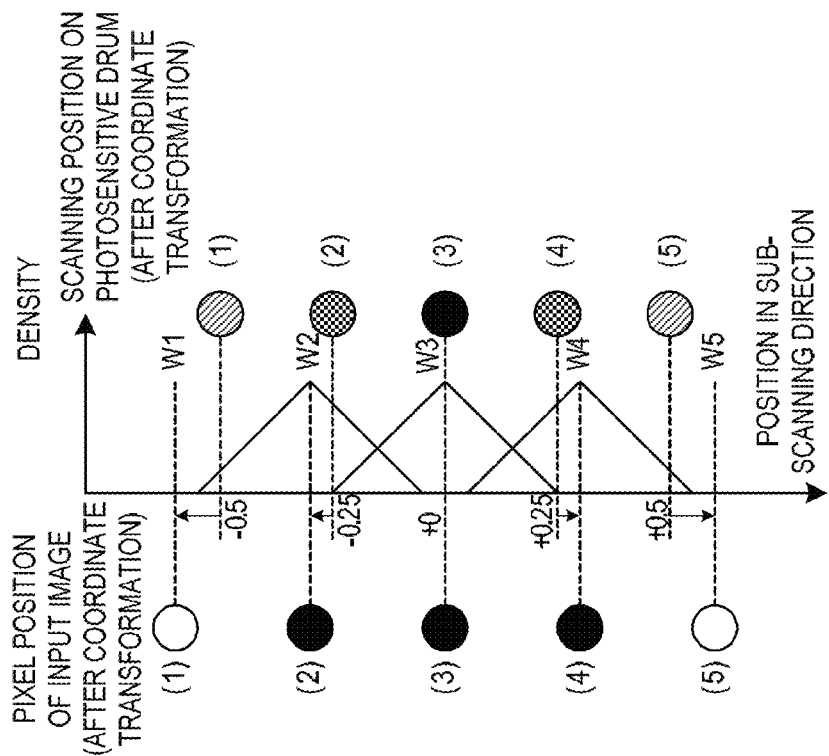

Further, the pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the result obtained by calculating the pixel values (1) to (5) of FIG. 12B to FIG. 12D are represented by shading of pixels in each column on the right side.

The positional deviation of the input pixels is illustrated so as to correspond to each pixel in the vertical axis of FIG. 12A to FIG. 12D. The positional deviation amount represented by the vertical axis of FIG. 12A to FIG. 12D is information on the positional deviation amount determined by an inverse function in accordance with the coordinate transformation of the scanning positions in the sub-scanning direction of the pixels of the input image. For example, in the case of FIG. 12A, as described with reference to FIG. 8A, the correction amount C of the positional deviation amount S of the scanning lines is −0.2. Further, for example, in the cases of FIG. 12C and FIG. 12D, the correction amounts C are calculated with use of Expressions (21) and (22), respectively.

FIG. 12A is an illustration of a state in which the scanning positions of the scanning lines are shifted in the advance direction in the sub-scanning direction, but the median points of the pixel values are shifted in the return direction, and hence the positions of the median points of the pixel values are corrected. FIG. 12B is an illustration of a state in which the scanning positions of the scanning lines are shifted in the return direction in the sub-scanning direction, but the median points of the pixel values are shifted in the advance direction, and hence the positions of the median points of the pixel values are corrected. FIG. 12C is the case in which the scanning positions are dense, and is an illustration of a state in which the distribution of density is widened due to the convolution operation after the coordinate transformation to cancel the local concentration of density, to thereby correct a local change in density. Further, FIG. 12D is the case in which the scanning positions are sparse, and is an illustration of a state in which the distribution of density is narrowed due to the convolution operation after the coordinate transformation to cancel the dispersion of density, to thereby correct a local change in density. In particular, the pixel value (3) of FIG. 12D is a density of (100+α)% that is higher than 100%.

(Filtering)

Referring back to FIG. 6, in Step S3604 of FIG. 6, the CPU 303 performs the filtering with the filtering portion 501 based on the attribute information for correction generated in Step S3603. Specifically, the CPU 303 performs a convolution operation and re-sampling with respect to the above-mentioned input image. The processing of Step S3604 performed by the CPU 303 will be described below in detail with reference to a flowchart of FIG. 13. When the CPU 303 starts the filtering through the convolution operation with the filtering portion 501, the CPU 303 performs the processing in Step S3703 and subsequent steps. In Step S3703, when the spread of the convolution function is defined as L, the CPU 303 extracts lines of an input image within a range of before and after ±L of the sub-scanning position of a line "yn" of an output image of interest, that is, the range of a width of 2L (range of from (yn−L) to (yn+L)). In this case, L is defined as a minimum value at which the value of the convolution function becomes 0 outside of the range of +L to −L of the convolution function. For example, in linear interpolation of FIG. 11A, L is equal to 1. In bicubic interpolation of FIG. 11B, L is equal to 2. In bicubic interpolation of FIG. 11C, L is equal to 3. The ymin and ymax within a range of from ymin to ymax of the corresponding input image satisfy the following condition with use of Expression (18).

$$ft^{-1}(y\min)=yn-L,\ ft^{-1}(y\max)=yn+L \quad \text{Expression (26)}$$

When Expression (26) is modified, the ymin and ymax are determined by Expression (27).

$$y\min=ft(yn-L),\ y\max=ft(yn+L) \quad \text{Expression (27)}$$

Thus, the lines of the input image to be extracted with respect to the line "yn" of the output image of interest are lines of all the integers within a range of from ymin to ymax.

When the line of the output image of interest is denoted by "yn", and the line of the input image to be subjected to the convolution operation is denoted by "ym", a distance "dnm" is represented by Expression (28).

$$dnm=yn-ft^{-1}(ym) \quad \text{Expression (28)}$$

Thus, in Step S3704, the CPU 303 obtains a coefficient "knm" as a convolution function g(y) with the filter coefficient setting portion 504 by Expression (29).

$$knm=g(dnm) \quad \text{Expression (29)}$$

In Step S3713, the CPU 303 determines whether or not the current scanning line is a leading line in the processing of eight lines, more specifically, whether or not a remainder (y %8, % means Modulo operation) obtained by dividing the current scanning line "y" by 8 is 1. When the CPU 303 determines in Step S3713 that the current scanning line is the leading line of the eight lines, the CPU 303 performs processing for each scanning in Step S3714. The processing in Step S3714 will be described later with reference to FIG. 14. When the CPU 303 determines in Step S3713 that the current scanning line is not the leading line of the eight lines, the CPU 303 proceeds to processing in Step S3705.

In Step S3705, the CPU 303 refers to the built-in timer which has been started when the BD signal has been received, to thereby determine whether or not a period of time T1 has elapsed. In this case, the period of time T1 is a period of time from timing at which the BD signal is output to timing at which the laser beam reaches the leading edge of the image area in the main scanning direction of the photosensitive drum 102, and the details thereof will be described in a second embodiment of the present invention. In Step S3705, when the CPU 303 determines that the period of time T1 has not elapsed, the CPU 303 returns to the processing in Step S3705. When the CPU 303 determines that the period of time T1 has elapsed, the CPU 303 proceeds to the processing in Step S3706. In Step S3706, the CPU 303 initializes the position "x" in the main scanning direction (set the position "x" to 1). In Step S3707, the CPU 303 obtains pixel data on the position in the sub-scanning direction in the input image extracted in Step S3703 and the position "x" of interest in the main scanning direction. The pixel data is defined as input pixel data $Pin_m$. In Step S3708, the CPU 303 performs the convolution operation with the filtering portion 501. More specifically, the filtering portion 501 subjects the corresponding coefficient "knm" determined in Step S3704 and the input pixel data $Pin_m$ obtained in S3707 to a product-sum operation, to thereby determine a value $Pout_n$ of the pixel of interest. The input pixel data $Pin_m$ is density of the pixel of interest before the filtering, and the value $Pout_n$ of the pixel of interest is output pixel data and is density of the pixel of interest after the filtering.

$$Pout_n = \sum_{m}^{all} k_{nm} \cdot Pin_m \qquad \text{Expression (30)}$$

Expression (30) corresponds to FIG. 12A to FIG. 12D. The darkness (density) of the circles on the left side in FIG. 12A to FIG. 12D corresponds to the input pixel data $Pin_m$. D1 and D2 in FIG. 12A correspond to $kn_m \times Pin_m$. The darkness (density) of the circles on the right side in FIG. 12A to FIG. 12D corresponds to $Pout_n$.

In Step S3709, the CPU 303 adds 1 to the position "x" in the main scanning direction. In Step S3710, the CPU 303 determines whether or not one line has been completed, that is, whether or not the scanning has reached the last pixel in one line. When the CPU 303 determines that one line has not been completed, the CPU 303 returns to the processing in Step S3707. When the CPU 303 determines that one line has been completed, the CPU 303 terminates the filtering. Thus, in the embodiment, distortion and uneven image density of an image caused by the deviation of an irradiation position due to a variation in arrangement intervals of light emitting points of a laser light source and the optical face tangle error of the mirror faces of the rotary polygon mirror 204 are corrected by subjecting a pixel position of an input image to the coordinate transformation based on a profile of positional deviation in the sub-scanning direction of the input image. Then, the filtering and sampling are performed, thereby being capable of cancelling positional deviation and local biased density such as banding while maintaining the density of each input image, with the result that a satisfactory image can be obtained.

(Calculation of Positional Deviation Amount Taking Uneven Speed of Photosensitive Drum into Account)

Figure 14:
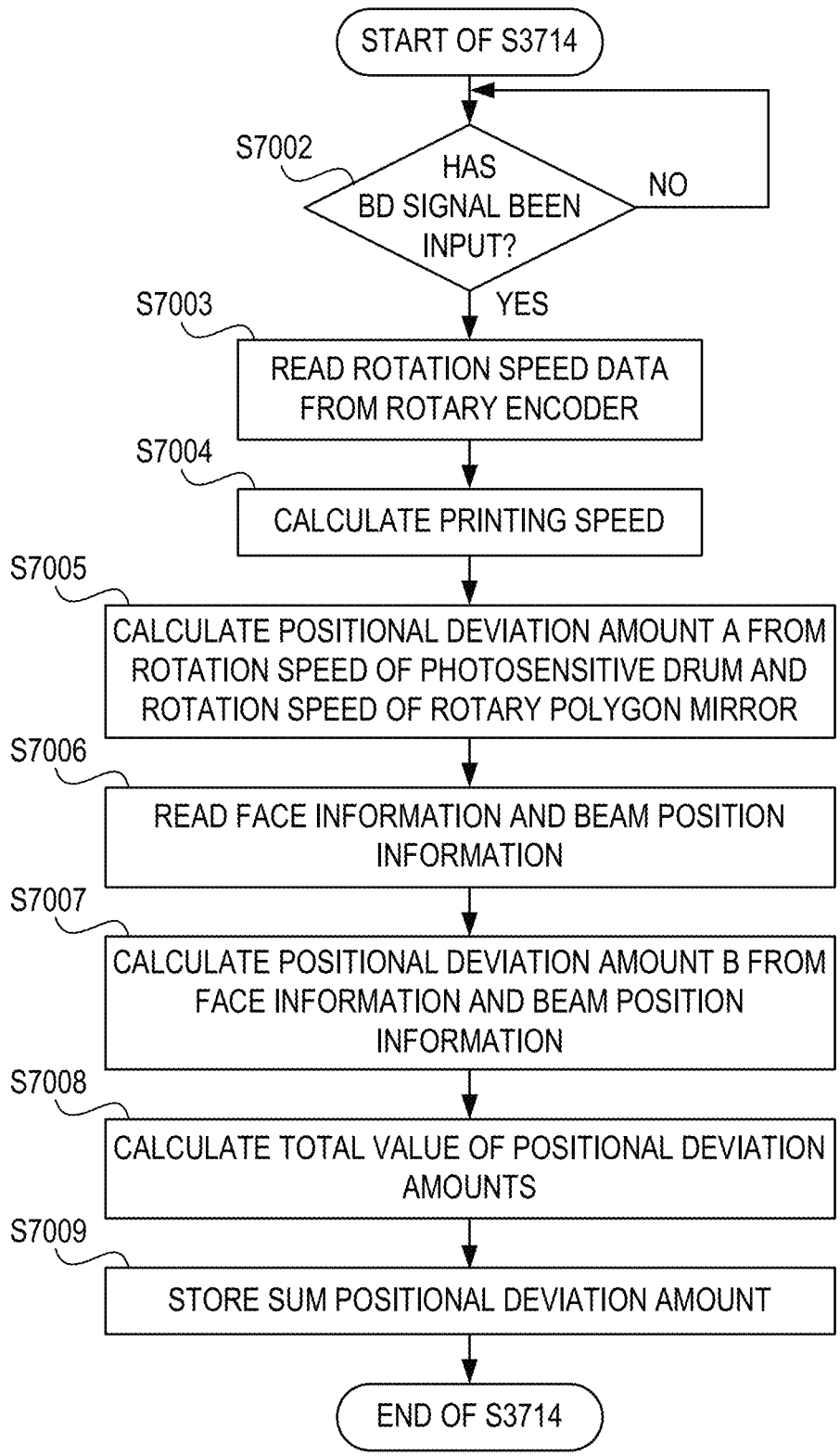
FIG. 14 is a flowchart for illustrating calculation processing of a positional deviation amount according to the first and second embodiments.

The details of processing for each scanning in Step S3714 will be described with reference to FIG. 14. FIG. 14 is a flowchart for illustrating processing of calculating a positional deviation amount performed by the CPU 303. The CPU 303 is configured to calculate a positional deviation amount for each scanning line during a period in which the predetermined period of time T1 elapses from the detection of the BD signal at a time of image formation (see FIG. 5), to thereby perform the control illustrated in FIG. 14 once per scanning. In Step S7002, the CPU 303 determines whether or not the BD signal has been input from the BD 207. When the CPU 303 determines in Step S7002 that the BD signal has been input, the CPU 303 stops a timer (not shown) measuring a time interval that is a period of the BD signal, reads a timer value, and stores the timer value in an internal register. Then, in order to measure a time interval up to a time when the next BD signal is received, the CPU 303 resets and starts the timer (not shown) and proceeds to processing in Step S7003. In the case where the CPU 303 includes two or more timers (not shown), different timers may be used alternately every time the BD signal is received, to thereby measure a time interval. Further, in this case, the measured time interval of the BD signal is stored in the internal register of the CPU 303, but the measured time interval may be stored in, for example, a RAM (not shown) serving as an internal storage unit for the CPU 303. When the CPU 303 determines in Step S7002 that the BD signal has not been input, the CPU 303 repeats the control in Step S7002 so as to wait for the input of the BD signal.

In Step S7003, the CPU 303 reads rotation speed data of the photosensitive drum 102 from the rotary encoder 301. In Step S7004, the CPU 303 calculates a printing speed Vpr based on the time interval of the BD signal stored in the internal register. The printing speed Vpr is calculated by dividing a value, which is obtained by multiplying the number of beams of the laser light source 201 by the interval of the scanning lines, by $\Delta T$ (time interval of the BD signal). For example, in the case of the embodiment, the number of beams is eight, and the interval of the scanning lines is 21.16 μm (resolution: 1,200 dpi), and hence Vpr=(8×21.16 μm)/$\Delta T$ is satisfied. A rotation speed Vp of the rotary polygon mirror 204 has a proportional relationship with the printing speed Vpr, and hence can be determined from the calculated printing speed Vpr. In Step S7005, the CPU 303 calculates a positional deviation amount A based on the rotation speed of the photosensitive drum 102 read in Step S7003 and the rotation speed of the rotary polygon mirror 204 calculated in Step S7004. A calculation method for the positional deviation amount A will be described in detail later.

In Step S7006, the CPU 303 reads face information (Y1 to Y5 in Table 1) and beam position information (X1 to X7 in Table 1) of the rotary polygon mirror 204 from the memory 302. In Step S7007, the CPU 303 calculates a positional deviation amount B (=Zmn) with use of Expression (2) based on the face information and the beam position information read in Step S7006. In Step S7008, the CPU 303 adds up the positional deviation amount A calculated in Step S7005 and the positional deviation amount B calculated in Step S7007, to thereby calculate a sum (total value) of the positional deviation amounts. In Step S7009, the CPU 303 stores the sum positional deviation amount calculated in Step S7008 in the internal register of the CPU 303. In this case, the positional deviation amount stored in the internal register is read and used for calculation at a time of the filtering described above.

(Calculation of Positional Deviation Amount)

A calculation expression of the positional deviation amount A calculated by the CPU 303 in Step S7005 will be described in detail. When the rotation speed of the photosensitive drum 102 is denoted by Vd, the rotation speed of the rotary polygon mirror 204 is denoted by Vp, and one scanning period is denoted by $\Delta T$ (see FIG. 5), the positional deviation amount A caused by a speed difference between the rotation speed Vd of the photosensitive drum 102 and the rotation speed Vp of the rotary polygon mirror 204 is calculated by Expression (31).

$$A = (Vd - Vp) \times \Delta T \qquad \text{Expression (31)}$$

In Expression (31), $\Delta T$ represents a period of time corresponding to an interval of output timing of the BD signal, and the positional deviation amount A represents a positional deviation amount of scanning lines that move during one scanning period due to the difference between the rotation speed Vd of the photosensitive drum 102 and the rotation speed Vp of the rotary polygon mirror 204. As described above, the rotation speed Vp of the rotary polygon mirror 204 is determined based on the printing speed Vpr. Then, the printing speed Vpr is determined based on the relationship between the one scanning period $\Delta T$ and the number of light emitting points (the light emitting points are eight in the embodiment) by Expressions (32) and (33).

$$Vp = \text{Number of beams} \times 21.16/\Delta T \qquad \text{Expression (32)}$$

$$\Delta T = 1/(\text{Number of mirror faces of rotary polygon mirror 204} \times \text{Revolutions per second of rotary polygon mirror 204}) \qquad \text{Expression (33)}$$

When the positional deviation caused by an uneven speed of the photosensitive drum 102 of the n-th scanning line from the reference position in the sub-scanning direction is denoted by An, the positional deviation in the sub-scanning direction is represented by an accumulation of the positional deviation of each scanning. Further, when the positional deviation amount based on the face information of the rotary polygon mirror 204 of the n-th scanning line from the reference position in the sub-scanning direction and the beam information is denoted by Bn, the position "y" in the sub-scanning direction of the n-th scanning line is represented by Expression (34).

$$y = n + \left(B_n + \sum_{p=1}^{n} A_p\right)$$ Expression (34)

The value "y" on the left side of Expression (34) is defined only when n is an integer. That is, the value "y" is a discrete function. However, in the embodiment, each value "y" determined from an integer is interpolated by linear interpolation and handled as a continuous function y=ft(n). In the embodiment, linear interpolation is used so as to simplify hardware, but interpolation of the function may be performed by other methods such as Lagrange interpolation and spline interpolation.

When the pixel positions in the sub-scanning direction are denoted by $y_{n0}$ and $y_{n0+1}$ with respect to pixel numbers n0 and n0+1 in the embodiment, an expression of conversion into the continuous function within a range of from the pixel position $y_{n0}$ to the pixel position $y_{n0+1}$ in the sub-scanning direction is given below.

$$y = y_{n0} \times (1-n+n0) + y_{n0+1} \times (n-n0)$$ Expression (35)

The processing of FIG. 14 is performed once per scanning, that is, once for eight beams. Therefore, in Steps S7006 to S7008, the positional deviation amounts of the eight beams are collectively calculated, and all the calculated positional deviation amounts of the eight beams are stored in Step S7009.

The rotation speed data of the photosensitive drum 102 is obtained in real time from the rotary encoder 301 and fed back to positional deviation correction. However, a profile of speed fluctuation data measured in advance may be stored in the memory 302, and positional deviation may be corrected in accordance with the stored profile. Further, when positional deviation information is obtained in real time, the positional deviation information may be directly used for correction of positional deviation although control is delayed. In this case, in order to prevent the influence caused by the delayed control, a particular frequency component such as a high-frequency component may be filtered with respect to a fluctuation amount of positional deviation to be used for correction of positional deviation.

Further, besides the linear interpolation and bicubic interpolation used as interpolation systems of the embodiment, interpolation in which a window function of a desired size is applied to a Sinc function or interpolation involving determining a convolution function in accordance with intended filter characteristics may be performed. Further, the present invention can be applied to an image output system or an image output device in which an interval between output pixels and lines is distorted irrespective of whether the system is an LED exposure system or an electrophotographic system. Further, in the embodiment, interpolation is performed by correcting a position of a pixel of an input image in accordance with Expressions (17) and (18), but functions approximate to Expressions (17) and (18) may be selected to be used for correction depending on the intended correction accuracy. Further, the configuration using the CPU 303 as the controller is described, but an application specific integrated circuit (ASIC), for example, may be used.

Figures 15A, 15B, 15C:
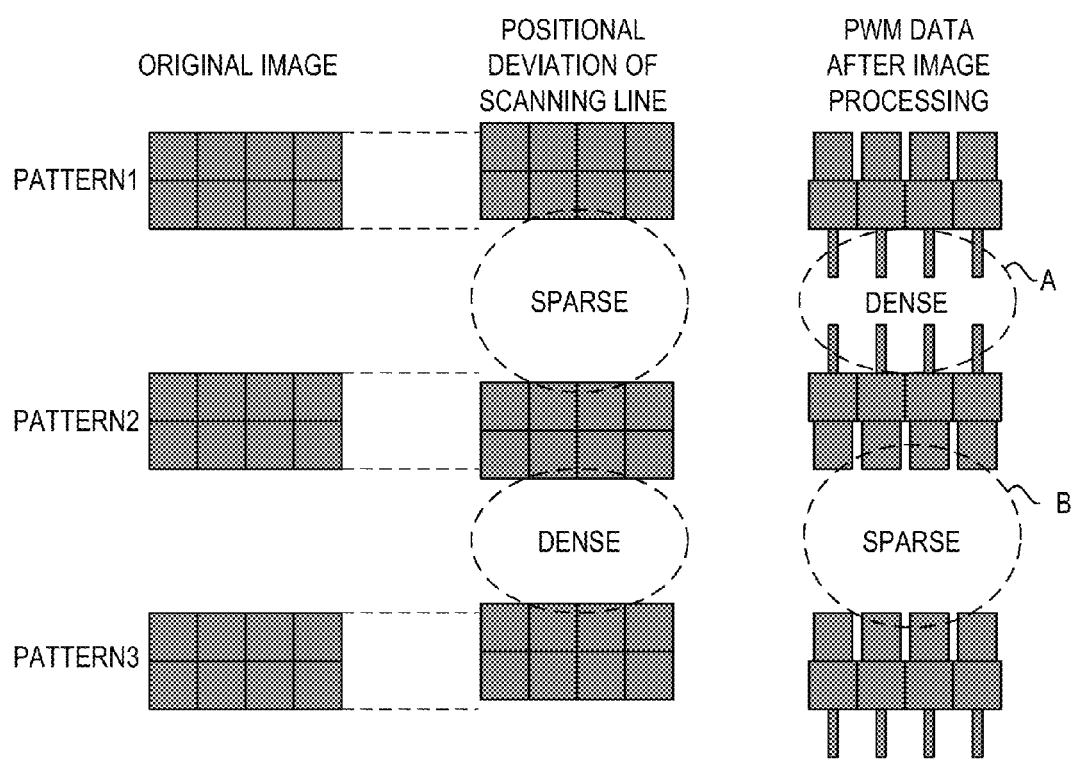
FIG. 15A, FIG. 15B, FIG. 15C, FIG. 15D, and FIG. 15E are views for illustrating image patterns before and after first correction processing and image patterns before and after second correction processing according to the first embodiment.

FIG. 15A is an illustration of original images including patterns 1 to 3 corresponding to a plurality of scanning lines. The patterns 1 to 3 of the original images are each formed of (2×4) black pixels including two dots in a vertical direction and four dots in a horizontal direction, and the patterns 1 to 3 are arranged at a predetermined interval. In FIG. 15B, due to the positional deviation of the scanning lines, an interval between the patterns 1 and 2 is widened to be sparse, and an interval between the patterns 2 and 3 is narrowed to be dense. The scanning lines having such positional deviation are subjected to the above-mentioned first correction processing, to thereby provide corrected patterns illustrated in FIG. 15C. The image data after the first correction processing becomes PWM data. As illustrated in FIG. 15C, thin pulses of black dots are gathered between the patterns 1 and 2 to become dense (broken line circle A), and thin pulses of white dots are gathered between the patterns 2 and 3 to becomes sparse (broken line circle B). Thus, by subjecting the scanning lines having positional deviation to the first correction processing according to the embodiment, the local density per area between the respective patterns can be adjusted to reduce uneven image density, e.g., banding, as a whole.

<Second Correction of Image Data>

Figures 15D, 15E:
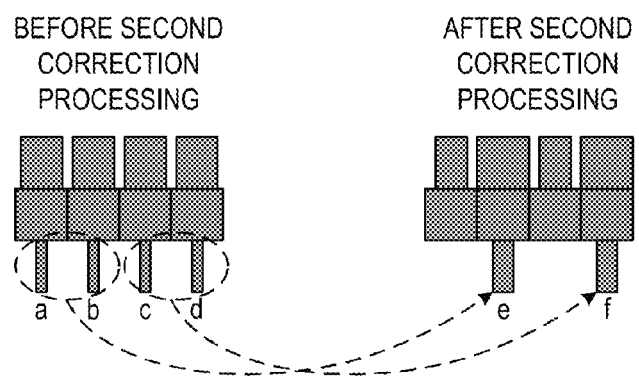

Next, second correction processing according to the embodiment will be described. In the second correction processing according to the embodiment, processing of collecting the thin pulses generated between the patterns 1 and 2 and between the patterns 2 and 3 of FIG. 15C is performed. FIG. 15D is an illustration of image data after the first correction processing, which has not been subjected to the second correction processing, and FIG. 15E is an illustration of image data obtained by subjecting the image data after the first correction processing to the second correction processing. In this case, the processing of collecting the thin pulses of black dots (broken line circle A) between the patterns 1 and 2 of FIG. 15C into dots as indicated by the broken line arrows between FIG. 15D and FIG. 15E is performed. Specifically, the second correction processing involves collecting pulses "a" and "b" of FIG. 15D into a pulse "e" of FIG. 15E and collecting pulses "c" and "d" of FIG. 15D into a pulse "f" of FIG. 15E. The second correction processing according to the embodiment also involves correcting a pixel value of a pixel (black dot) that is caused to be output in the first correction processing or a pixel (white dot) that is caused not to be output in the first correction processing by moving the pixel value in the main scanning direction so that a pixel value is caused to be output or not to be output with a plurality of continuous pixels.

The details of the second correction processing will be described with reference to a flowchart of FIG. 16. In Step S1203, the CPU 303 initializes a counter "x" in the main scanning direction of image data, that is, in the main scanning direction before processing for each line is performed to 0 (x=0). Further, the CPU 303 initializes a stored density ND described later to 0 (ND=0). Now, a coordinate of a current scanning line of interest is defined as "y", and coordinates representing a pixel of interest are defined as (x,y). Further, regarding image data of the pixel of interest (x,y), a pixel value before the first correction processing (also sometimes referred to as "filtering") is performed (before correction) is defined as pix0(x,y), and a pixel value after the first correction processing is performed is defined as pix1(x,y). The CPU 303 subjects the pixel value pix1(x,y)

after the first correction processing to the second correction processing, to thereby newly determine a pixel value pix1(x,y).

In Step S1204, the CPU 303 determines whether or not the pixel value pix1(x,y) after the filtering of the pixel of interest (x,y) that is a predetermined pixel has increased from the pixel value pix0(x,y) before the filtering (pix0(x,y)<pix1(x,y)). When the CPU 303 determines in Step S1204 that the pixel value pix1(x,y) after the filtering of the pixel of interest (x,y) has not increased from the pixel value pix0(x,y) before the filtering, the CPU 303 proceeds to processing in Step S1211. In this case, the pixel value pix1(x,y) after the filtering of the pixel of interest (x,y) is not subjected to the second correction processing.

When the CPU 303 determines in Step S1204 that the pixel value pix1(x,y) after the filtering of the pixel of interest (x,y) has increased from the pixel value pix0(x,y) before the filtering, the CPU 303 proceeds to processing in Step S1205. This case corresponds to, for example, a case in which a pixel value increases after the filtering (FIG. 15C) compared to that before the filtering (FIG. 15B) as indicated by the thin pulses of black dots between the patterns 1 and 2 of FIG. 15C. In Step S1205, the CPU 303 determines whether or not the density (pixel value pix0(x,y)) before the filtering of the pixel of interest (x,y) is 0% or less (pix0(x,y)≤D0). Herein, the density of 0% is also described as "D0". When the CPU 303 determines in Step S1205 that the density of the pixel of interest (x,y) is not D0 or less, the CPU 303 determines that the pixel value of the pixel of interest (x,y) is to be output directly, and proceeds to processing in Step S1207.

When the CPU 303 determines in Step S1205 that the density of the pixel of interest (x,y) is D0 or less, the CPU proceeds to processing in Step S1206. This case corresponds to, for example, pixels that were D0 as illustrated in FIG. 15B before the filtering as indicated by the thin pulses of black dots of FIG. 15C. In Step S1206, the CPU 303 defines a sum (ND+pix1(x,y)) of the stored density ND and the pixel value pix1(x,y) after the filtering of the pixel of interest (x,y) as a new stored density ND. Further, the CPU 303 defines the pixel value pix1(x,y) after the filtering of the pixel of interest (x,y) as D0 (pix1(x,y)=D0). In this case, the stored density ND is used for moving a pixel value of a predetermined pixel in the main scanning direction, that is, carrying over density. The processing in Step S1206 involves, in outputting a thin black dot as indicated by "a" of FIG. 15D by the filtering, adding the pixel value of the pixel to the stored density ND, to thereby carry over the density to following pixels.

In Step S1207, the CPU 303 determines whether or not the sum of the pixel value pix1(x,y) after the filtering of the pixel of interest (x,y) and the stored density ND exceeds a density of 100% (ND+pix1(x,y)>D100). Herein, the density of 100% is also described as "D100". When the CPU 303 determines in Step S1207 that the sum of the pixel value pix1(x,y) after the filtering of the pixel of interest (x,y) and the stored density ND exceeds D100, the CPU 303 proceeds to processing in Step S1208. In Step S1208, the CPU 303 defines a value obtained by subtracting D100 from the sum (ND+pix1(x,y)) of the pixel value pix1(x,y) after the filtering of the pixel of interest (x,y) and the stored density ND as a new stored density ND (ND=ND+pix1(x,y)−D100). Further, the CPU 303 defines an output of the pixel of interest (x,y) as the density of 100% (D100) (pix1(x,y)=D100), and the CPU 303 proceeds to processing in Step S1211. In this case, dots are output as in the pulses "e" and "f" of FIG. 15E.

When the CPU 303 determines in Step S1207 that the sum (ND+pix1(x,y)) of the pixel value pix1(x,y) after the filtering of the pixel of interest (x,y) and the stored density ND does not exceed the density of 100%, the CPU 303 proceeds to processing in Step S1209. In Step S1209, the CPU 303 determines whether or not the sum (ND+pix1(x,y)) of the pixel value pix1(x,y) after the filtering of the pixel of interest (x,y) and the stored density ND exceeds a threshold value Dth that is a predetermined value of density (ND+pix1(x,y)>Dth). When the CPU 303 determines in Step S1209 that the sum of the pixel value pix1(x,y) after the filtering of the pixel of interest (x,y) and the stored density ND exceeds the threshold value Dth, the CPU proceeds to processing in Step S1210. In Step S1210, the CPU 303 defines an output of the pixel of interest (x,y) as the sum of the pixel value pix1(x,y) after the filtering of the pixel of interest (x,y) and the stored density ND (pix1(x,y)=ND+pix1(x,y)). Further, the CPU 303 sets the stored density ND to 0 (ND=0) and proceeds to processing in Step S1211. Also in this case, dots are output as in the pulses "e" and "f" of FIG. 15E.

When the CPU 303 determines in Step S1209 that the sum (ND+pix1(x,y)) of the pixel value pix1(x,y) after the filtering of the pixel of interest (x,y) and the stored density ND does not exceed the threshold value Dth, that is, the sum is the threshold value Dth or less (predetermined value or less), the CPU 303 proceeds to processing in Step S1211. In this case, the CPU 303 does not output the pixel value pix1(x,y) after the filtering of the pixel of interest (x,y), and adds the pixel value pix1(x,y) after the filtering of the pixel of interest (x,y) to pixel values of a next pixel (x+1, y) and the following pixels of the pixel of interest (x,y) in the main scanning direction. This processing can also be considered as processing of carrying over a pixel value that has not been output to a next pixel and the following pixels, and in the embodiment, the pixel value that has not been output is added to the stored density ND, to thereby carry over the pixel value.

In Step S1211, the processing of one pixel has been completed, and hence the CPU 303 increments the counter "x" in the main scanning direction by 1 (x=x+1). In Step S1212, the CPU 303 determines whether or not the counter "x" in the main scanning direction has reached the number of pixels corresponding to one line, that is, whether or not the second correction processing has been completed for all the pixels in one line. When the CPU 303 determines in Step S1212 that the second correction processing has not been completed for all the pixels in one line, the CPU 303 returns to the processing in Step S1204. When the CPU 1303 determines in Step S1212 that the second correction processing has been completed for all the pixels in one line, the CPU 1303 finishes the second correction processing.

As described above, according to the embodiment, satisfactory image quality can be obtained by correcting a distorted image and uneven image density. The embodiment has a configuration in which, when corrected components (black pulses and white pulses of FIG. 15C) caused by the first correction processing exceed the predetermined density threshold value Dth, pulses are generated (output). Therefore, electrophotographically stable correction can be carried out by performing the second correction processing. Further, a density value (pixel value) is stored in the main scanning direction, and hence the corrected components do not spread in the sub-scanning direction, and uneven image density in the sub-scanning direction can be effectively corrected. Further, according to the embodiment, collecting increases of density is focused on. However, white and black configurations are replaced from each other, and decreases of density may be collected to obtain electrophotographic stability. Further, the second correction processing may be performed for both the black dots and the white dots.

Second Embodiment

Figure 16:
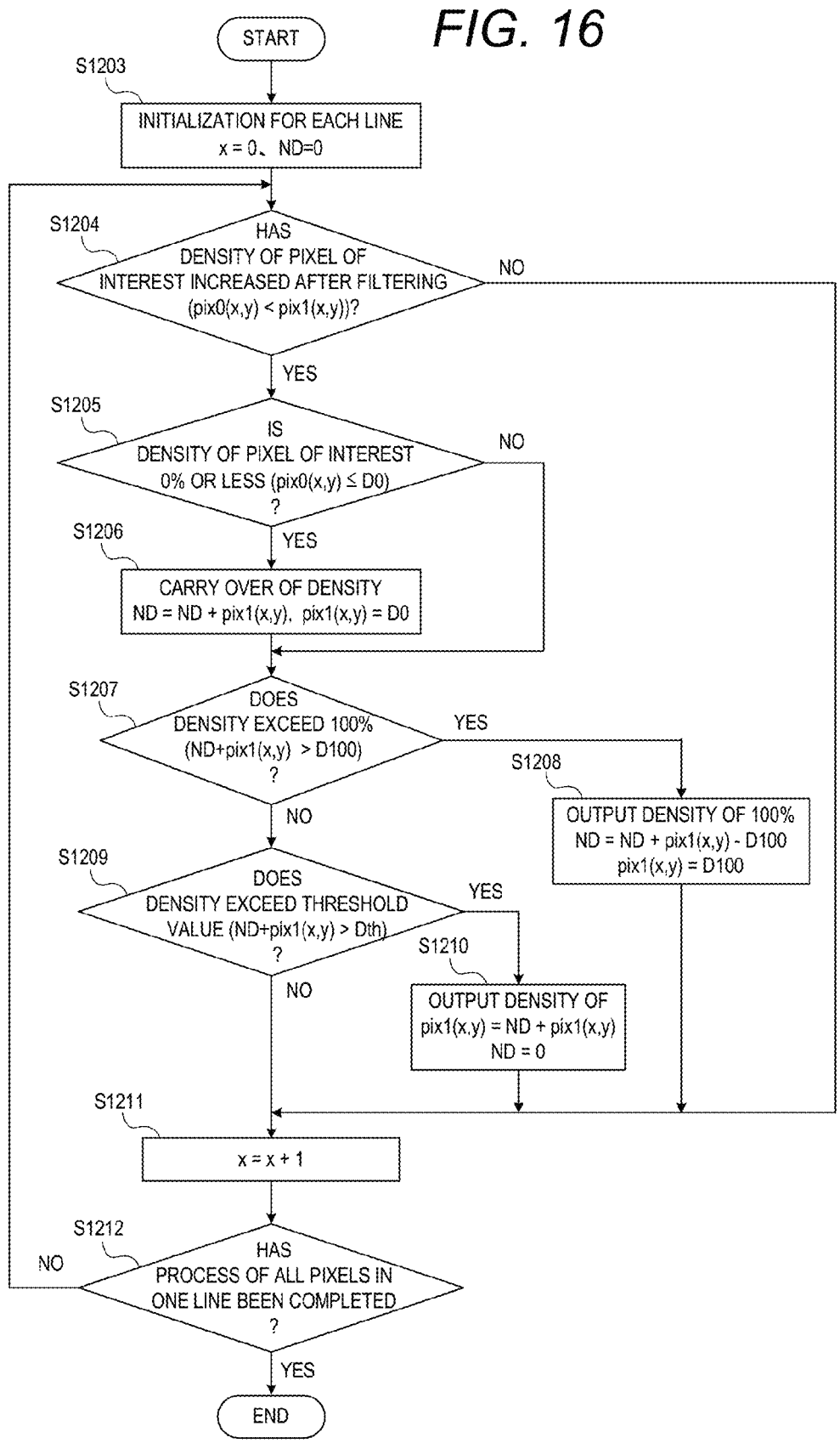
FIG. 16 is a flowchart for illustrating the second correction processing according to the first and second embodiments.
Figure 17A:
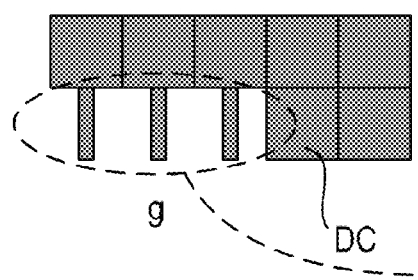
FIG. 17A, FIG. 17B, FIG. 17C, and FIG. 17D are views for illustrating image patterns before and after third correction processing according to the second embodiment.
Figure 17B:
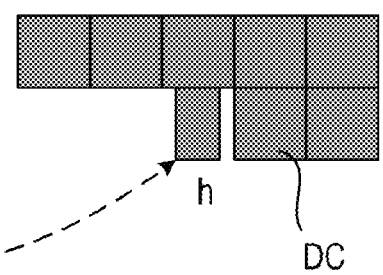

The basic configuration of a second embodiment of the present invention is the same as that of the first embodiment, and the second embodiment is different from the first embodiment only in the processing in Step S1210 of the flowchart of FIG. 16 described in the first embodiment. In the embodiment, a corner of an image in the main scanning direction is detected, and density generated by the second correction processing of a pixel of interest is moved toward the corner. FIG. 17A and FIG. 17B are each an illustration of a specific example of third correction processing according to the embodiment. FIG. 17A is an illustration of image data before the third correction processing is performed, and thin pulses "g" surrounded by the broken line are brought close to a portion DC of a corner of an image to provide a pulse "h" after the third correction processing as illustrated in FIG. 17B.

Figure 17C:
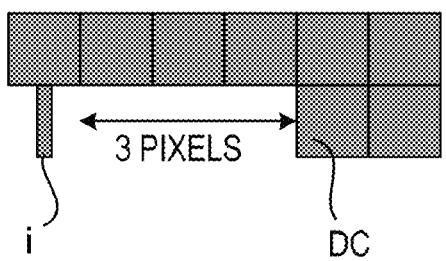
Figure 17D:
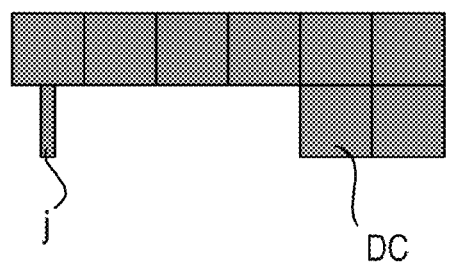

Further, when the position of the portion DC of the corner of the image is separated from the pixel of interest by a predetermined distance or more, the third correction processing is prohibited so as to prevent deformation of the image. FIG. 17C and FIG. 17D are illustrations of a specific example in which the third correction processing is prohibited because a thin pulse "i" of a pixel of interest is separated from the portion DC of the corner of the image by three pixels or more. FIG. 17C is an illustration of an image before the third correction processing, in which the thin pulse "i" caused by density generated by the first correction processing of the pixel of interest is separated from the portion DC of the corner of the image by three pixels. Therefore, the third correction processing is prohibited, and an image after the third correction processing of FIG. 17D has not been changed by the third correction processing, that is, a pulse "j" remains to be the pulse after the first correction processing (the same as the pulse "i").

<Third Correction of Image Data>

Figure 18:
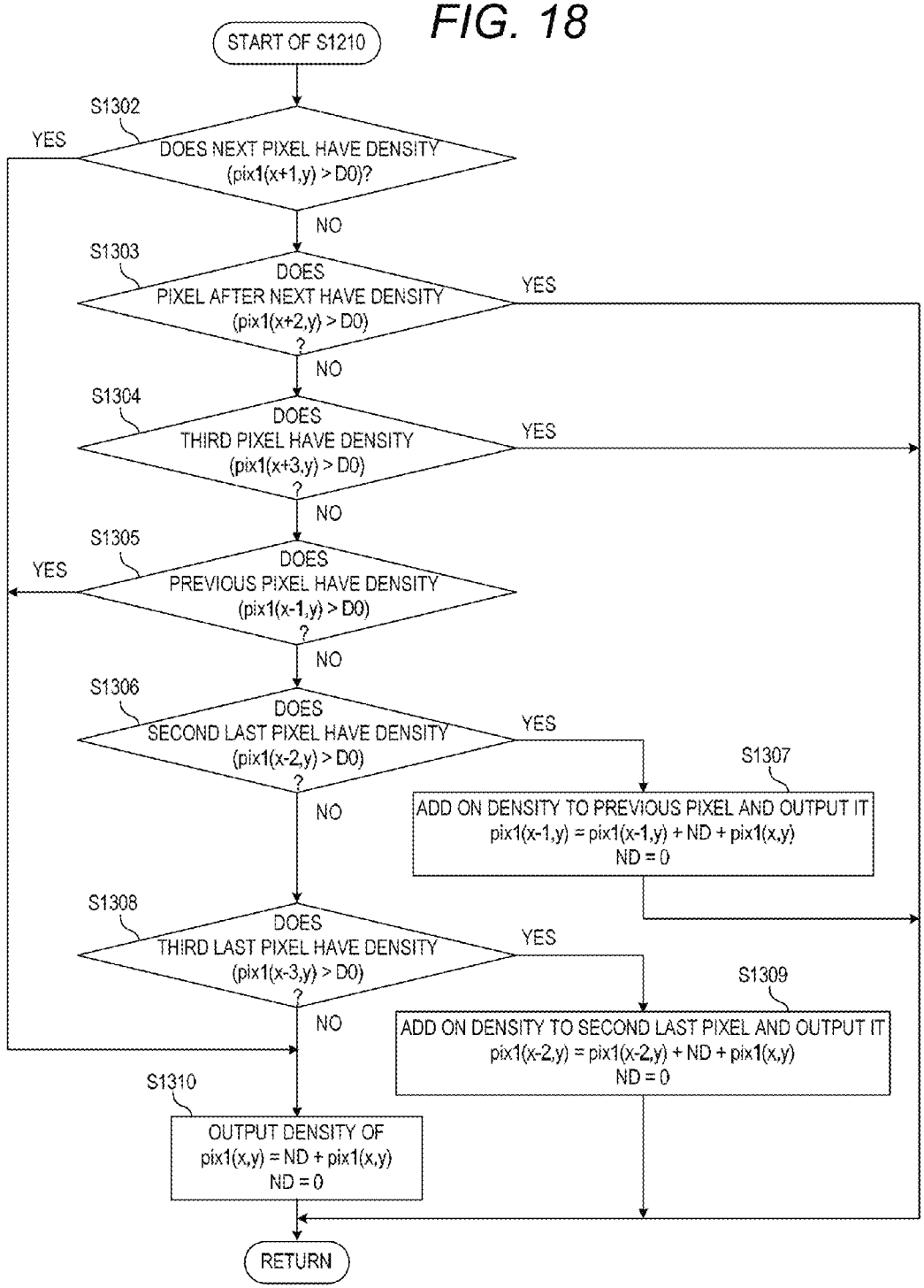
FIG. 18 is a flowchart for illustrating the third correction processing according to the second embodiment.
Figure 19A:
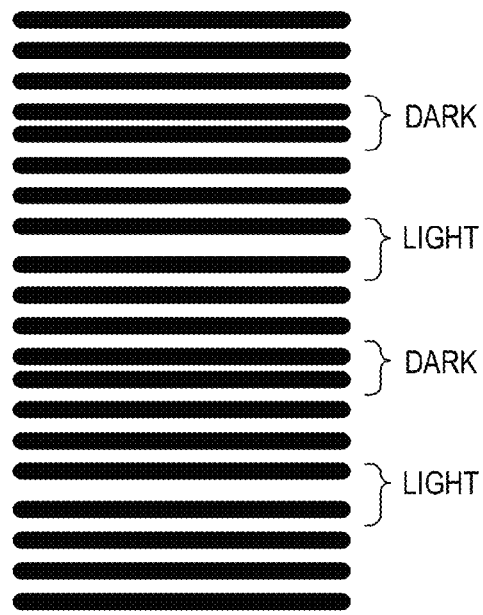
FIG. 19A is a diagram for illustrating uneven image density in the conventional art.
Figure 19B:
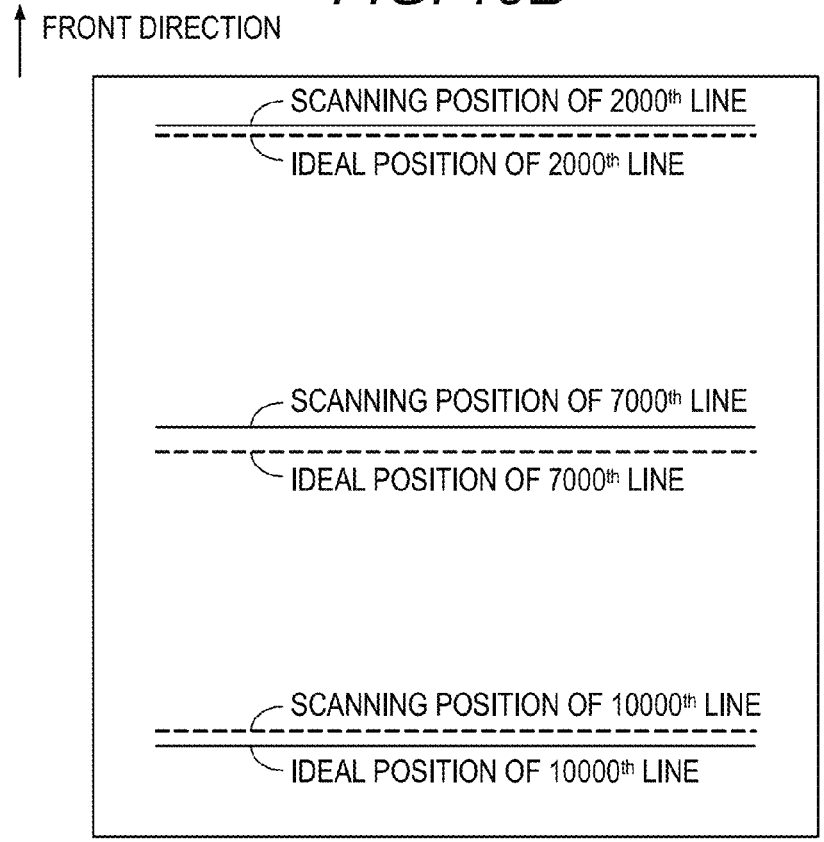
FIG. 19B is a diagram for illustrating positional deviation of scanning lines.

The details of Step S1210, which is a difference from the first embodiment and is the third correction processing, will be described below with reference to a flowchart of FIG. 18. In Step S1302, the CPU 303 determines whether or not a next pixel (x+1,y) of a pixel of interest (x,y) has density, that is, whether or not a density value pix1(x+1,y) of the next pixel (x+1,y) is higher than D0. That the density value is higher than D0 is hereinafter referred to as "pixel has density". When the CPU 303 determines in Step S1302 that the next pixel (x+1,y) has density, the CPU 303 proceeds to processing in Step S1310. In Step S1310, the CPU 303 outputs a sum (ND+pix1(x,y)) of the pixel value pix1(x,y) after the filtering of the pixel of interest (x,y) and the stored density ND as an output value of the pixel of interest (x,y). Further, the CPU 303 sets the stored density ND to 0 (ND=0) and finishes the processing in Step S1210.

When the CPU 303 determines in Step S1302 that the next pixel (x+1,y) of the pixel of interest (x,y) does not have density, in Step S1303, the CPU 303 determines whether or not a pixel after next (x+2,y) of the pixel of interest (x,y) has density. When the CPU 303 determines in Step S1303 that the pixel after next (x+2,y) has density, the CPU 303 finishes the processing in Step S1210. When the CPU 303 determines in Step S1303 that the pixel after next (x+2,y) does not have density, the CPU 303 determines in Step S1304 whether or not a third pixel (x+3,y) has density. When the CPU 303 determines in Step S1304 that the third pixel (x+3,y) has density, the CPU 303 finishes the processing in Step S1210. When the CPU 303 determines in Step S1304 that the third pixel (x+3,y) does not have density, the CPU 303 proceeds to processing in Step S1305.

In Step S1305, the CPU 303 determines whether or not a previous pixel (x−1,y) of the pixel of interest (x,y) has density. When the CPU 303 determines in Step S1305 that the previous pixel (x−1,y) has density, the CPU 303 proceeds to processing in Step S1310. In this case, a pixel value of the pixel of interest (x,y) is output together with the previous pixel (x−1,y) adjacent to the pixel of interest (x,y) in the main scanning direction. When the CPU 303 determines in Step S1305 that the previous pixel (x−1,y) does not have density, the CPU 303 proceeds to processing in Step S1306. In Step S1306, the CPU 303 determines whether or not a second last pixel (x−2,y) of the pixel of interest (x,y) has density. When the CPU 303 determines in Step S1306 that the second last pixel (x−2,y) has density, the CPU 303 proceeds to processing in Step S1307. In Step S1307, the CPU 303 adds the stored density ND and the pixel value pix1(x,y) after the filtering of the pixel of interest (x,y) to a pixel value pix1(x−1,y) of the previous pixel (x−1,y). Then, the CPU 303 outputs the pixel value pix1(x−1,y) of the previous pixel (x−1,y) (pix1(x−1,y)=pix1(x−1,y)+ND+pix1(x,y)). In other words, the CPU 303 outputs the pixel value pix1(x,y) after the filtering of the pixel of interest (x,y) by moving the pixel value pix1(x,y) to the previous pixel. Further, the CPU 303 sets the stored density ND to 0 (ND=0) and finishes the processing in Step S1210.

When the CPU 303 determines in Step S1306 that the second last pixel (x−2,y) does not have density, in Step S1308, the CPU 303 determines whether or not the third last pixel (x−3,y) of the pixel of interest (x,y) has density. When the CPU 303 determines in Step S1308 that the third last pixel (x−3,y) has density, the CPU 303 proceeds to processing in Step S1309. In Step S1309, the CPU 303 adds the stored density ND and the pixel value pix1(x,y) after the filtering of the pixel of interest (x,y) to the pixel value pix1(x−2,y) of the second last pixel (x−2,y). Then, the CPU 303 outputs the pixel value pix1(x−2,y) of the second last pixel (x−2,y) (pix1(x−2,y)=pix1(x−2,y)+ND+pix1(x,y)). In other words, the CPU 303 outputs the pixel value pix1(x,y) after the filtering of the pixel of interest (x,y) by moving the pixel value pix1(x,y) to the second last pixel. Further, the CPU 303 sets the stored density ND to 0 (ND=0) and finishes the processing in Step S1210. In the third correction processing, when there is at least one pixel to be output among a predetermined number of pixels after the pixel of interest and a predetermined number of pixels before the pixel of interest, the pixel value of the pixel of interest is added to a pixel value of a pixel adjacent to the at least one pixel. Then, the pixel value of the adjacent pixel after the addition is output.

When the CPU 303 determines in Step S1308 that the third last pixel (x−3,y) does not have density, the CPU 303 proceeds to processing in Step S1310. In this case, there is no pixel to be output (having density) up to the third pixel and the third last pixel from the pixel of interest (x,y), and hence in the processing in Step S1310, the pixel value of the pixel of interest (x,y) is output. Thus, in the third correction processing, when the pixel value of the pixel of interest exceeds the threshold value Dth, in the case where there is no pixel to be output among a predetermined number of pixels after the pixel of interest and a predetermined number of pixels before the pixel of interest in the main scanning direction, the pixel value of the pixel of interest is output.

As described above, in the third correction processing according to the embodiment, when the pulses "g" as illustrated in FIG. 17A are generated due to the filtering (first correction processing), the processing in Step S1307 and Step S1309 is performed to collect the pulses "g" into the pulse "h" of FIG. 17B. Further, when the isolated pulse "i" separated by a predetermined distance (three pixels or more in the embodiment) from the portion DC of the corner of the image as illustrated in FIG. 17C is generated due to the filtering, the processing of collecting density is prohibited, and the processing in Step S1310 is performed to directly output the pulse "j" of FIG. 17D.

As described above, according to the embodiment, satisfactory image quality can be obtained by correcting distortion and uneven image density of an image. Further, the processing involving finding a corner of the periphery at a predetermined distance of image data and collecting density is performed, and hence processing that is stable in terms of an electrophotographic process can be performed. Further, the processing of collecting density to a place separated by a predetermined distance or more is not performed. In other words, the third correction processing is prohibited, and hence correction can be performed without deforming an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141776, filed Jul. 16, 2015, which is hereby incorporated by reference herein in its entirety.

What is claimed is:

1. A correction method for an image forming apparatus, the image forming apparatus comprising:
   a light source comprising a plurality of light emitting points;
   a photosensitive member configured to rotate in a first direction so that a latent image is formed on the photosensitive member with light beams emitted from the light source; and
   a deflecting mirror configured to deflect the light beams emitted from the light source to move light spots of the light beams radiated to the photosensitive member in a second direction orthogonal to the first direction to form scanning lines,
   the correction method comprising:
   a first correction step of correcting sparseness and denseness of density in the first direction caused by deviation of a scanning line in the first direction by moving a predetermined pixel in the first direction in accordance with the deviation of the scanning line, and causing a pixel value of the predetermined pixel to be output or not to be output in accordance with a movement of the predetermined pixel; and
   a second correction step of correcting the pixel value of the predetermined pixel that is caused to be output or not to be output in the first correction step by moving the pixel value of the predetermined pixel in the second direction so that a pixel value is caused to be output or not to be output with a plurality of continuous pixels,
   wherein the second correction step comprises, when the pixel value of the predetermined pixel before correction is 0 and is increased by a correction in the first correction step, and when the pixel value of the predetermined pixel is a predetermined value or less, preventing the pixel value of the predetermined pixel from being output, and adding the pixel value of the predetermined pixel to a pixel value of a next pixel of the predetermined pixel in the second direction.

2. A correction method according to claim 1, wherein the second correction step comprises, when the pixel value of the predetermined pixel is more than the predetermined value, outputting the pixel value of the predetermined pixel.

3. A correction method according to claim 1, wherein the second correction step comprises, when the pixel value of the predetermined pixel is more than the predetermined value, and when there is no pixel to be output among a predetermined number of pixels after the predetermined pixel in the second direction and the predetermined number of pixels before the predetermined pixel in the second direction, outputting the pixel value of the predetermined pixel.

4. A correction method according to claim 3, wherein the second correction step comprises, when there is at least one pixel to be output among the predetermined number of pixels after the predetermined pixel and the predetermined number of pixels before the predetermined pixel, preventing the pixel value of the predetermined pixel from being output, and adding the pixel value of the predetermined pixel to a pixel value of a pixel adjacent to the at least one pixel, to output the pixel value of the adjacent pixel after the addition.

5. A correction method according to claim 1, wherein the first correction step comprises:
   a storing step of storing, in a storage unit, information on positional deviation of the scanning lines in the first direction;
   a conversion step of converting positions of pixels of an input image by performing coordinate transformation based on the information stored in the storage unit so that an interval between the scanning lines on the photosensitive member becomes a predetermined interval; and
   a filtering step of determining pixel values of pixels of an output image by subjecting pixel values of the pixels of the input image to a convolution operation based on the positions of the pixels of the input image after the coordinate transformation.

6. A correction method according to claim 5, wherein the conversion step comprises determining the positions of the pixels of the input image after the coordinate transformation with use of an inverse function $ft^{-1}(n)$ of a function $ft(n)$ by the following expression:

$$fs'(n)=ft'(ft^{-1}(fs(n)))$$

where:
   $fs(n)$ represents a function indicating a position of an n-th pixel in the first direction of the input image;
   $ft(n)$ represents a function indicating a position of the n-th pixel in the first direction of the output image;
   $fs'(n)$ represents a function indicating a position of the n-th pixel in the first direction of the input image after the coordinate transformation; and
   $ft'(n)$ represents a function indicating a position of the n-th pixel in the first direction of the output image after the coordinate transformation.

7. A correction method according to claim 6, wherein the conversion step comprises determining, when the function $fs(n)$ satisfies $fs(n)=n$ and the function $ft'(n)$ satisfies $ft'(n)=n$, the positions of the pixels of the input image after the coordinate transformation by the following expression:

$$fs'(n)=ft^{-1}(n).$$

8. A correction method according to claim 6, wherein the conversion step comprises interpolating, when the function fs(n) indicating the positions of the pixels of the input image or the function ft(n) indicating the positions of the pixels of the output image takes discrete values, the discrete values to obtain a continuous function.

9. A correction method according to claim 5, wherein the filtering step comprises performing the convolution operation with use of linear interpolation or bicubic interpolation.

10. A correction method according to claim 5,
wherein the pixel values comprise density values, and
wherein the filtering step comprises storing density values per predetermined area before and after performing the convolution operation.

11. A correction method according to claim 6, wherein, in the filtering step, when a width in the first direction within a range excluding 0 of a convolution function to be used for the convolution operation is defined as 2L, a range of from ymin to ymax of the pixels of the input image corresponding to a range of the width of 2L with a position yn of a predetermined pixel of the output image being a center is defined as the following expressions:

$ymin=ft(yn-L)$; and $ymax=ft(yn+L)$.

12. A correction method according to claim 5,
wherein the image forming apparatus further comprises a detection unit configured to detect a rotation speed of the photosensitive member, and
wherein the positional deviation in the first direction is corrected based on the rotation speed of the photosensitive member detected by the detection unit.

13. A correction method according to claim 5,
wherein the deflecting mirror comprises a rotary polygon mirror having a predetermined number of faces, and
wherein the information to be stored in the storage unit contains information on a variation in angle for each of the faces with respect to a rotary shaft of the rotary polygon mirror.

14. A correction method according to claim 5, wherein the predetermined interval is determined in accordance with a resolution of image formation by the image forming apparatus.

\* \* \* \* \*